US012452696B2

(12) United States Patent
Zhang et al.

(10) Patent No.: US 12,452,696 B2
(45) Date of Patent: Oct. 21, 2025

(54) REUSING A CROSS LINK INTERFERENCE FRAMEWORK FOR SELF-INTERFERENCE MEASUREMENT

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US)

( * ) Notice: Subject to any disclaimer, the term of this patent is extended or adjusted under 35 U.S.C. 154(b) by 0 days.

(21) Appl. No.: 18/513,467

(22) Filed: Nov. 17, 2023

(65) Prior Publication Data

US 2024/0089748 A1 Mar. 14, 2024

Related U.S. Application Data

(62) Division of application No. 17/301,805, filed on Apr. 14, 2021, now Pat. No. 11,856,391.

(Continued)

(51) Int. Cl.
*H04B 17/336* (2015.01)
*H04B 7/06* (2006.01)
(Continued)

(52) U.S. Cl.
CPC .......... *H04W 16/28* (2013.01); *H04B 7/0696* (2023.05); *H04B 17/336* (2015.01);
(Continued)

(58) Field of Classification Search
CPC ............................. H04W 16/28; H04B 17/336
See application file for complete search history.

(56) References Cited

U.S. PATENT DOCUMENTS 11,206,549 B1  12/2021  Eyuboglu
11,271,699 B1   3/2022  Eyuboglu et al.
(Continued)

FOREIGN PATENT DOCUMENTS

WO    2018023086 A1    2/2018
WO    2019164363 A1    8/2019

OTHER PUBLICATIONS

International Preliminary Report On Patentability—PCT/US2021/027553—The International Bureau of WIPO—Geneva, Switzerland—Oct. 27, 2022.

(Continued)

*Primary Examiner* — Zhiren Qin

(57) ABSTRACT

The present disclosure provides for a configuration that enables an apparatus to determine beam pairs for full duplex communication based on a cross-link interference procedure. The apparatus determines a subset of receive beams based on a beam measurement process, where each receive beam is associated with a different antenna array panel. In some aspects, the apparatus performs a channel measurement process based on the subset of receive beams. The apparatus sweeps through transmitted sounding reference signals from a same transmit beam corresponding to each receive beam of an antenna array panel and receives the transmitted sounding reference signals incrementally through other receive beams associated with other antenna array panels. The apparatus measures a self-interference for at least one beam pair of the subset of receive beams based on a received sounding reference signal. The apparatus selects one or more beam pairs based on a self-interference measurement or a signal-to-interference-plus-noise ratio.

11 Claims, 16 Drawing Sheets

Related U.S. Application Data

(60) Provisional application No. 63/012,041, filed on Apr. 17, 2020, provisional application No. 63/012,017, filed on Apr. 17, 2020.

(51) Int. Cl.
    *H04L 5/00*         (2006.01)
    *H04L 25/02*       (2006.01)
    *H04W 16/28*     (2009.01)
    *H04W 24/10*     (2009.01)

(52) U.S. Cl.
    CPC ........ *H04L 5/0051* (2013.01); *H04L 25/0226* (2013.01); *H04W 24/10* (2013.01)

(56) References Cited

U.S. PATENT DOCUMENTS

| | | |
|---|---|---|
| 2015/0257073 A1 | 9/2015 | Park et al. |
| 2018/0205427 A1 | 7/2018 | Ghosh et al. |
| 2018/0255472 A1* | 9/2018 | Chendamarai Kannan ................. H04W 72/0453 |
| 2019/0082337 A1* | 3/2019 | Gheorghiu .............. H04L 5/001 |
| 2019/0260485 A1* | 8/2019 | Byun ....................... H04W 4/40 |
| 2019/0274053 A1* | 9/2019 | Wang .................... H04W 16/10 |
| 2019/0280784 A1 | 9/2019 | Kwak et al. |
| 2019/0305838 A1 | 10/2019 | Davydov et al. |
| 2019/0327629 A1 | 10/2019 | Zhang et al. |
| 2019/0342871 A1 | 11/2019 | Tang |
| 2020/0076493 A1 | 3/2020 | Lee et al. |
| 2020/0287677 A1 | 9/2020 | Kakishima et al. |
| 2021/0329473 A1 | 10/2021 | Zhang et al. |
| 2021/0345141 A1 | 11/2021 | Cao |

OTHER PUBLICATIONS

International Search Report and Written Opinion—PCT/US2021/027553—ISA/EPO—Jul. 21, 2021.

Huawei, et al., "Overview of Rel-17 Work Areas for NR and LTE", 3GPP TSG RAN Meeting #84, RP-191486, Final. (WAS RP-191007), 3rd Generation Partnership Project, Mobile Competence Centre, 650, Route Des Lucioles, F-06921, Sophia-Antipolis, vol. TSG RAN, No. Newport Beach, USA, Jun. 3, 2019-Jun. 6, 2019, Jun. 4, 2019, 22 Pages,. May 29, 2019, XP051748412.

European Search Report—EP23200434—Search Authority—Munich—Jan. 17, 2024.

\* cited by examiner

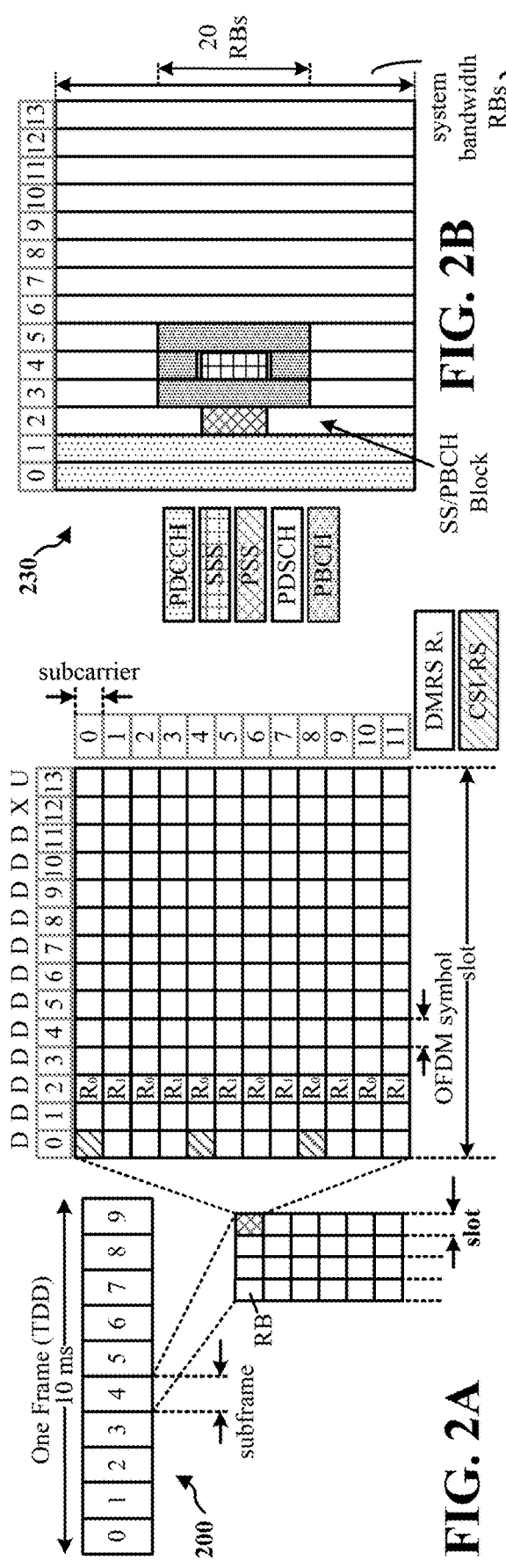
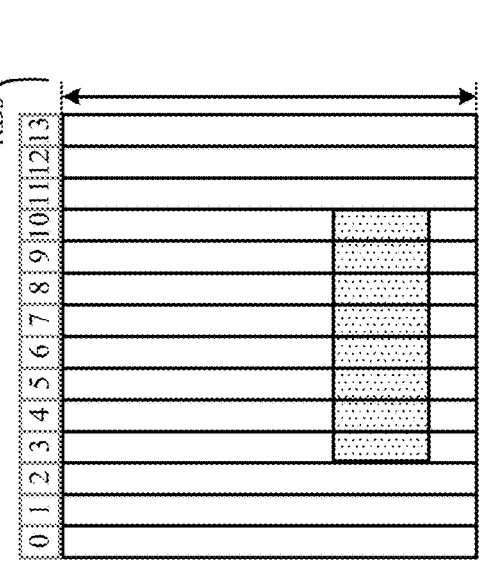
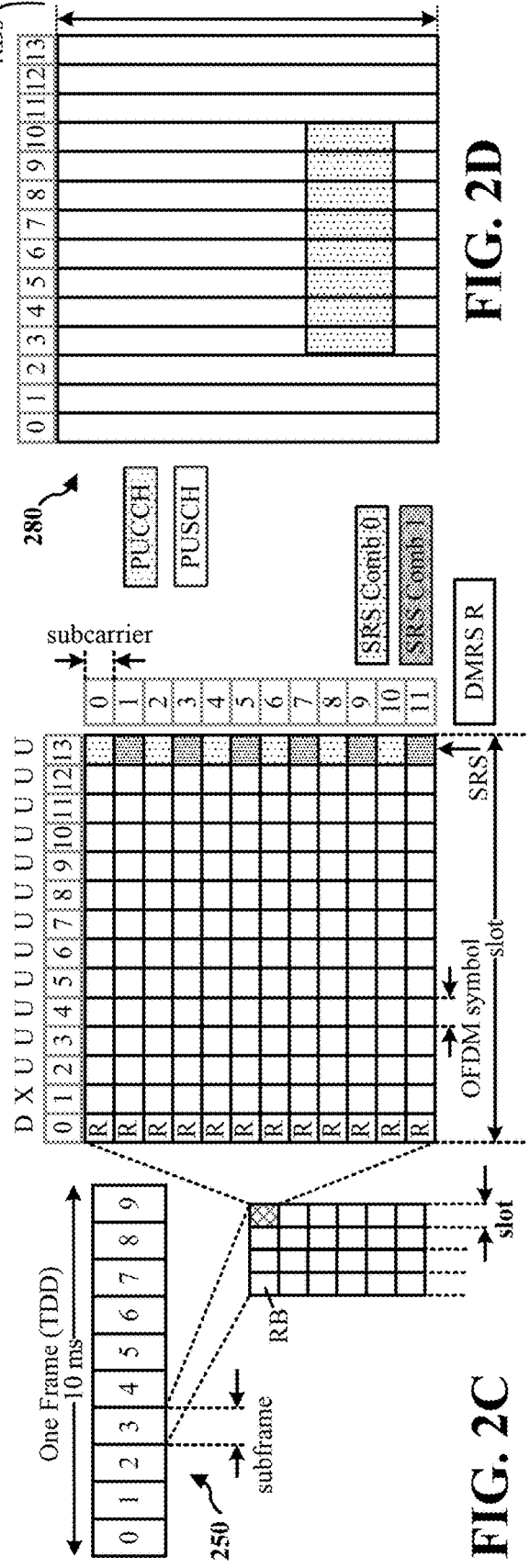

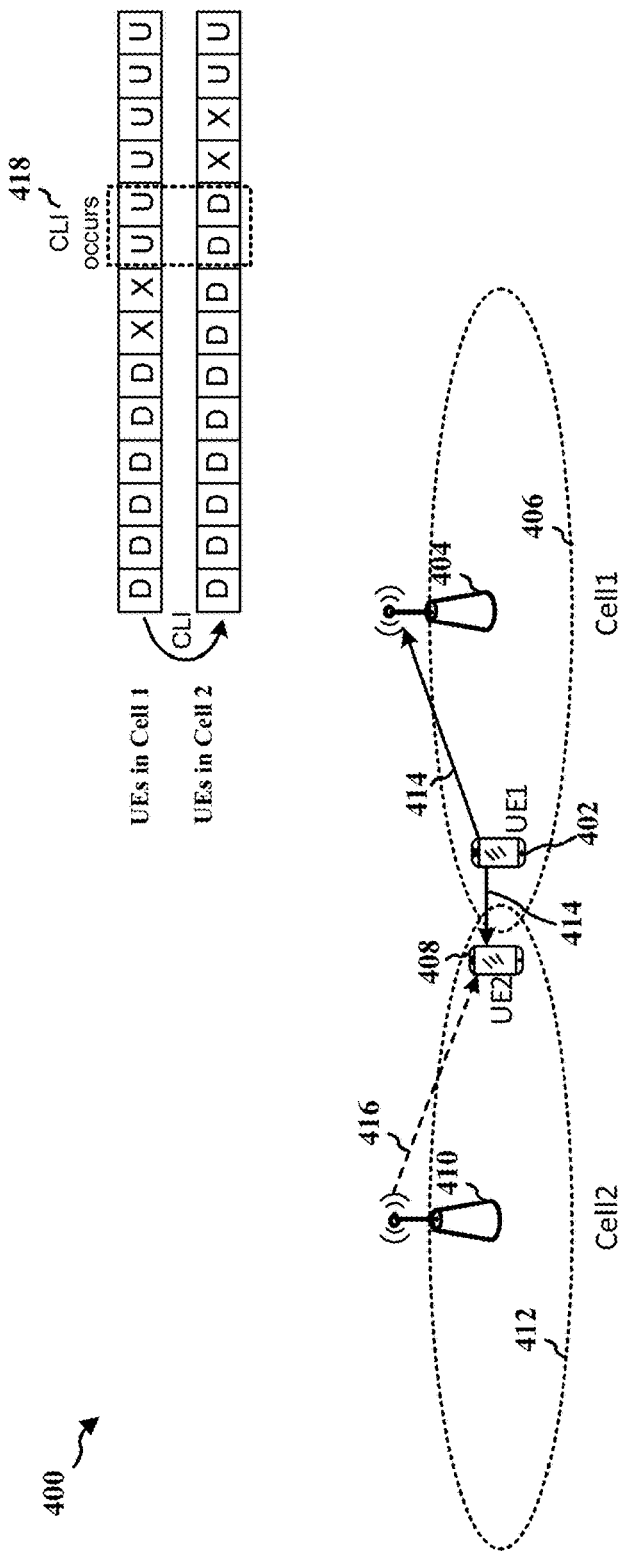
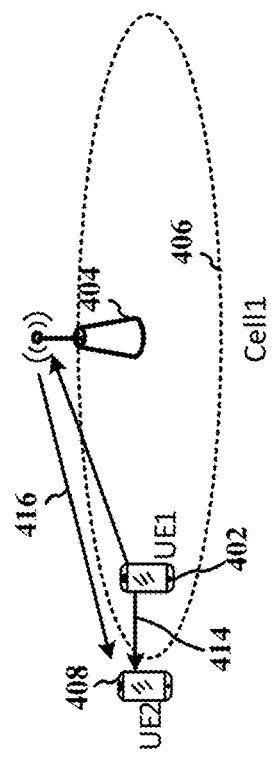
FIG. 4A
FIG. 4B

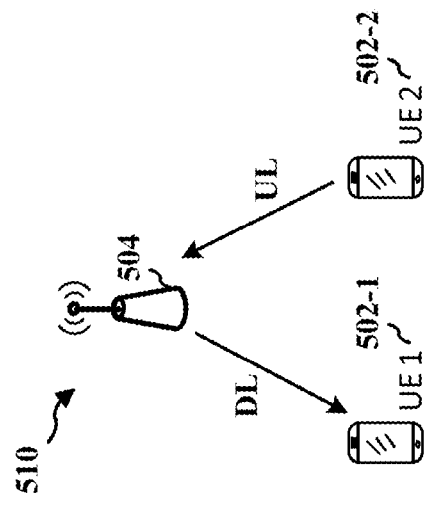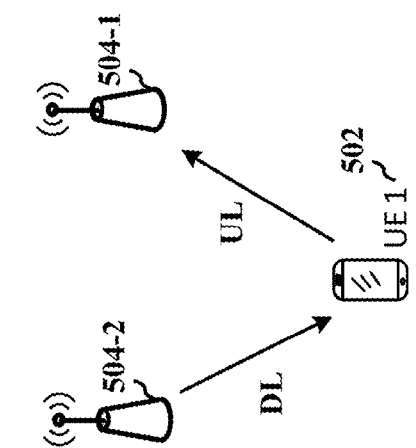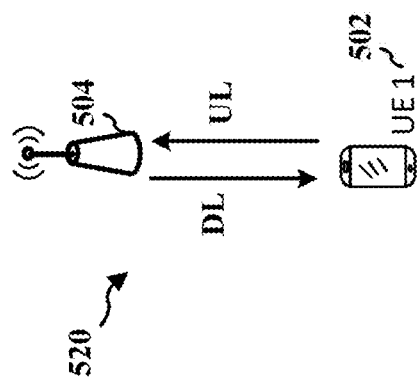
FIG. 5A
FIG. 5B
FIG. 5C

REUSING A CROSS LINK INTERFERENCE FRAMEWORK FOR SELF-INTERFERENCE MEASUREMENT

CROSS REFERENCE TO RELATED APPLICATION(S)

This application is a Divisional of U.S. Non-Provisional application Ser. No. 17/301,805, entitled "REUSING A CROSS LINK INTERFERENCE FRAMEWORK FOR SELF-INTERFERENCE MEASUREMENT," filed on Apr. 14, 2021, which claims the benefit of U.S. Provisional Patent Application Ser. No. 63/012,041, entitled "REUSING CLI FRAMEWORK FOR SELF-INTERFERENCE MEASUREMENT," filed on Apr. 17, 2020, and U.S. Provisional Patent Application Ser. No. 63/012,017, entitled "REUSING L1-SINR FRAMEWORK FOR SELF-INTERFERENCE MEASUREMENT," filed on Apr. 17, 2020, all of which are expressly incorporated by reference herein in their entirety.

BACKGROUND

Technical Field

The present disclosure relates generally to communication systems, and more particularly, to reusing a cross link interference (CLI) framework for a self-interference measurement (SIM) procedure in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a user equipment (UE). The device may be a processor and/or a modem at a UE or the UE itself. The apparatus determines a subset of receive (Rx) beams based on a beam measurement process and each Tx beam is associated with a Tx beam at the base station, each Rx beam of the subset of Rx beams being associated with one antenna array panel of a plurality of different antenna array panels. The apparatus sweeps through transmitting sounding reference signals (SRS) from a same transmit (Tx) beam corresponding to each Rx beam of one panel of the plurality of different panels and receiving the transmitted SRS incrementally through other Rx beams associated with other panels of the plurality of different panels. The apparatus measures for at least one pair of Tx/Rx beams of the subset of beams a self-interference based on the received SRS. The apparatus selects one or more pairs of Tx/Rx beams of the subset of beams based at least on a self-interference and the selection may consider cross link interference as well with receiving the indication on high CLI beams from the base station. The apparatus reports the selected one or more pairs of Tx/Rx beams to a base station.

In an aspect of the disclosure, a method, a computer-readable medium, and an apparatus are provided. The apparatus may be a device at a base station. The device may be a processor and/or modem at a base station or the base station itself. The apparatus configures a first user equipment for self-interference measurement process with the first UE and a cross-link interference process with a set of neighbor UEs. The apparatus receives, from each UE of the set of neighbor UEs, a CLI measurement report. The apparatus receives, from the first UE, a SIM report indicating SIM results from the SIM process. The apparatus selects a transmit beam/receive beam pair with the first UE based on at least one of the received SIM report or the CLI report from the set of neighbor UEs to enable full duplex transmission and reception with the selected Tx/Rx beam pair at the UE.

In an aspect of the disclosure, a method, a computer-readable medium, and an apparatus are provided. The apparatus may be a device at a UE. The device may be a processor and/or a modem at a UE or the UE itself. The apparatus determines a subset of receive beams based on a beam measurement process. Each Rx beam associated with a transmit beam at a base station. Each Rx beam of the subset of Rx beams being associated with one antenna array panel of a plurality of different antenna array panels. The apparatus performs a CM process based on the determined subset of Tx beams at the base station and Rx beams at the UE. The apparatus sweeps, in a SIM process, through transmitting sounding reference signals from a same Tx beam corresponding to each Rx beam of one panel of the plurality of different panels and receiving the transmitted SRS incrementally through other Rx beams associated with the plurality of different panels at the UE. The apparatus measures for at least one pair of Tx/Rx beams of the subset of beams a channel quality based on the received channel state information resource signal (CSI-RS) from the base station and a self-interference based on the received SRS. The apparatus selects one or more pairs of Tx/Rx beams of the UE. The selected Tx/Rx beams having the highest values of signal-to-interference-plus-noise ratio (SINR). The apparatus reports the selected Tx/Rx beams to a base station. The base station further decides on a best Tx/Rx beam pair of the UE to enable full duplex transmission and reception at the UE.

In an aspect of the disclosure, a method, a computer-readable medium, and an apparatus are provided. The apparatus may be a device at a base station. The device may be a processor and/or modem at a base station or the base station itself. The apparatus configures a user equipment for a channel measurement (CM) process. The apparatus configures the UE for a self-interference measurement process. The apparatus receives, from the UE, a signal-to-interference-plus-noise ratio report based on results of the CM process and the SIM process. The apparatus selects a transmit uplink (UL) beam/receive downlink (DL) beam pair with the UE based on the received SINR report from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A-4B are diagrams illustrating examples of a wireless network operating in a semi-static TDD configuration or a dynamic TDD configuration, respectively.

FIGS. 5A-5C are diagrams illustrating examples of full duplex communications.

DETAILED DESCRIPTION

Figure 1:
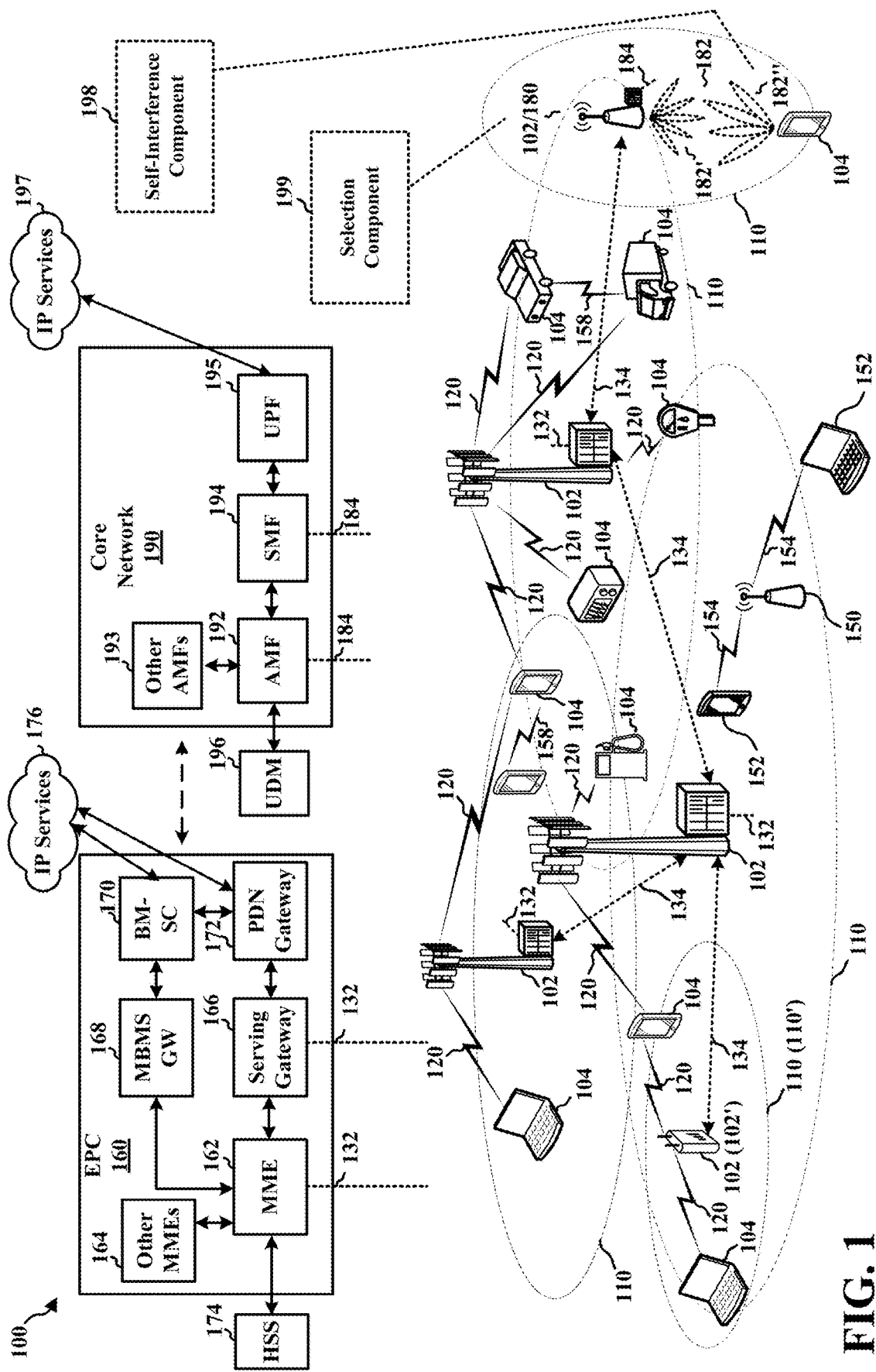
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform a self-interference procedure. For example, the UE 104 of FIG. 1 may include a self-interference component 198 configured to measure for at least one pair of Tx/Rx beams of a subset of beams a self-interference based on a received SRS. The UE 104 may determine a subset of Rx beams based on a beam measurement process. Each Rx beam of the subset of Rx beams may be associated with one antenna array panel of a plurality of different antenna array panels. The UE 104 may sweep through transmitting SRS from a same Tx beam corresponding to each Rx beam of one panel of the plurality of different panels and receive the transmitted SRS incrementally through other Rx beams associated with other panels of the plurality of different panels. The UE 104 measures for at least one pair of Tx/Rx beams of the subset of beams a self-interference based on the received SRS. The UE 104 selects one or more pairs of Tx/Rx beams based at least on a self-interference measurement, and the selection may consider cross link interference (CLI) as well with receiving the indication on high CLI beams from the base station. The UE 104 reports the selected one or more pairs of Tx/Rx beams to a base station.

In other aspects, the UE 104 may be configured to perform a self-interference procedure. For example, the UE 104 of FIG. 1 may include a self-interference component 198 configured to measure for at least one pair of Tx/Rx beams of a subset of beams a self-interference based on a received SRS. The UE 104 may determine a subset of Rx beams based on a beam measurement process. Each Rx beam of the subset of Rx beams may be associated with one antenna array panel of a plurality of different antenna array panels. The UE 104 may perform a channel measurement (CM) process based on the determined subset of Rx beams. The UE 104 may sweep, in a self-interference measurement (SIM) process, through transmitting SRS from a same Tx beam corresponding to each Rx beam of one panel of the plurality of different panels and receive the transmitted SRS incrementally through other Rx beams associated with the plurality of different panels. The UE 104 measures for at least one pair of Tx/Rx beams of the subset of beams a self-interference based on the received SRS. The UE 104 selects one or more pairs of Tx/Rx beams, wherein the selected Tx/Rx beams comprising at least one of a highest channel quality based on SINR measurements or a lowest interference. The UE 104 reports the selected Tx/Rx beams to a base station 180.

Referring again to FIG. 1, in certain aspects, the base station 180 may be configured to select a Tx beam/Rx beam pair with a first UE. For example, the base station 180 of FIG. 1 may include a selection component 199 configured to select the Tx beam/Rx beam pair with a first UE. The base station 180 may configure a first UE for a SIM process with the first UE and a CLI process with a set of neighbor UEs. The base station 180 may receive, from each UE of the set of neighbor UEs, a CLI measurement report. The base station 180 may receive, from the first UE, a SIM report indicating SIM results from the SIM process. The base station 180 may select a Tx beam/Rx beam pair with the first UE based on at least one of the received SIM report or the CLI report from the set of neighbor UEs.

In other aspects, the base station 180 may be configured to select a Tx beam/Rx beam pair with a first UE. For example, the base station 180 of FIG. 1 may include a selection component 199 configured to select the Tx UL beam/Rx DL beam pair with a first UE. The base station 180 may configure a UE for a CM process. The base station 180 may configure the UE for a SIM process. The base station 180 may receive, from the UE, a SINR report based on results of the CM process and the SIM process. The base station 180 may select a Tx UL beam/Rx DL beam pair with the UE based on the received SINR report from the UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^\mu * 15$ kHz, where y is the numerology 0 to 5. As such, the numerology μ=0 has a subcarrier spacing of 15 kHz and the numerology μp=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
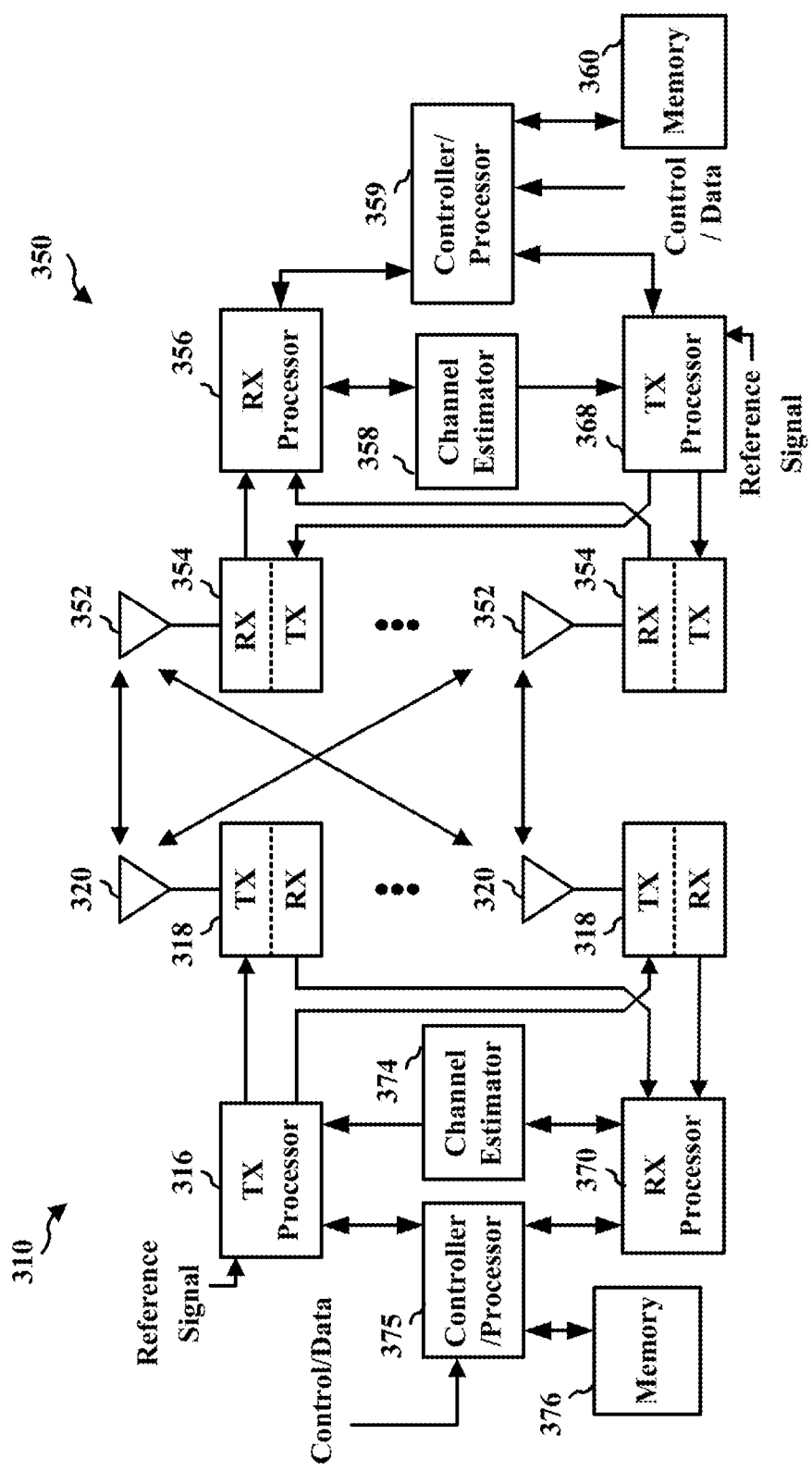
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

FIG. 4A is a diagram illustrating a wireless network 400 operating in a semi-static TDD configuration. FIG. 4B is a diagram illustrating a wireless network 420 operating in dynamic TDD configuration. Dynamic TDD may enhance spectrum efficiency of wireless communication networks and provide a higher throughput by dynamically altering uplink (UL) or downlink (DL) transmission direction. However, if nearby UEs have different TDD UL-DL slot formats, one UE (e.g., UE2 408) may be a victim and may receive UL transmission from another UE (e.g., UE1 402) known as an aggressor. The received UL transmission from the UE1 402 is known as cross link interference (CLI). CLI occurs when a UL symbol (e.g., an interfering symbol) of an aggressor collides with a DL symbol (e.g., an interfered symbol) of a victim. CLI may be caused by an UL transmission from the aggressor UE (e.g., 402). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 4A, UE1 402 is within Cell1 406 and is being served by base station 404, while UE2 408 is within Cell2 412 and is being served by base station 410. CLI may occur between UEs at the cell edges of nearby cells, as UEs at cell edges of nearby cells may be in close proximity to each other. As shown in FIG. 4A, UE1 402 and UE2 408 are at their respective cell edges, and may be communicating with their respective base stations. UE1 402 may send an UL transmission 414 to base station 404, while UE2 408 is receiving a DL transmission 416 from base station 410. However, in certain instances, the UL transmission 414 sent by UE1 402 to base station 404 may also be received by UE2 408 while receiving the DL transmission 416 from base station 410. The UL transmission 414 from UE1 402 received by UE2 408 causes CLI 414 and may interfere with the DL transmission 416 UE2 408 from base station 410. As such, one or more UL symbols of the CLI 414 may collide with one or more DL symbols of the DL transmission 416. In the example of FIG. 4A, two UL symbols of the CLI signal 414 overlap or collide with two DL symbols of the DL transmission 416, such that CLI occurs at the overlap 418.

In the example of FIG. 4B, both UE1 402 and UE2 408 are being served by the same cell (e.g., cell1 406). Both UE1 402 and UE2 408 are near the cell edge, and in some instances, the UL transmission 414 sent by UE1 402 to base station 404 may also be received by UE2 408 while receiving the DL transmission 416 from base station 404. The UL transmission 414 from UE1 402 received by UE2 may cause CLI 414 and may interfere with the DL 416 of UE2 408 from the base station 404. As such, one or more UL symbols of the CLI 414 may collide with one or more DL symbols of the DL transmission 416.

CLI measurements metrics include sounding reference signals reference signal received power (SRS-RSRP) and CLI-reference signal strength indicator (CLI-RSSI). SRS-RSRP may include the linear average of the power contributions of the SRS to be measured over the configured resource elements within the considered measurement frequency bandwidth in the time resources in the configured measurement occasions. CLI-RSSI may include the linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered and periodic reporting is supported. Layer3 (L3) filtering may be applied, such that for CLI-RSSI measurements, the implementation of the UE may determine whether to reset filtering upon a bandwidth part (BWP) switch. A dedicated measurement gap may not be needed.

FIGS. 5A-5C are diagrams illustrating examples 500, 510, 520 of full duplex (FD) communication. The example 500 of FIG. 5A includes a UE1 502 and two base station (e.g., TRPs) 504-1, 504-2, wherein the UE1 502 is sending UL transmissions to base station 504-1 and is receiving DL transmissions from base station 504-2. In the example 500 of FIG. 5A, FD is enabled for the UE1 502, but not for the base stations 504-1, 504-2. The example 510 of FIG. 5B includes two UEs, UE1 502-1 and UE2 502-2 and a base station 504, wherein the UE1 502-1 is receiving a DL transmission from the base station 504 and the UE2 502-2 is transmitting a UL transmission to the base station 504. In the example 510 of FIG. 5B, FD is enabled bot the base station 504, but not for the UEs UE1 502-1 and UE2 502-2. The example 520 of FIG. 5C includes a UE1 502 and a base station 504, wherein the UE1 502 is receiving a DL transmission from the base station 504 and the UE1 502 is transmitting a UL transmission to the base station 504. In the example 520 of FIG. 5C, FD is enabled for both the UE1 502 and the base station 504.

The present disclosure relates to improving the manner in which flexible TDD operates to allow for FD communication, simultaneous UL/DL transmission in frequency range 2 (FR2). Flexible TDD capability may be present at either a base station or UE, or both. For example, for a UE, UL transmission may be from one antenna panel and DL reception may be in another antenna panel. FD communication may be conditional on a beam separation of the UL beam and DL beam at the respective antenna panels. As such, improving the manner in which the selection of the UL beam and DL beam for FD communication is desirable. Utilizing FD communication may provide a reduction in latency, such that it may be possible to receive a DL signal in UL only slots, which may enable latency savings. In addition, FD communication may enhance spectrum efficiency per cell or per UE, and may allow for a more efficient utilization of resources.

Beam separation of the UL and DL beams assist in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by selecting beam pairs that minimize or reduce self-interference. As such, measuring the self-interference at the UE may assist in determining beam pairs of UL and DL beams that may support FD communication.

Figure 6:
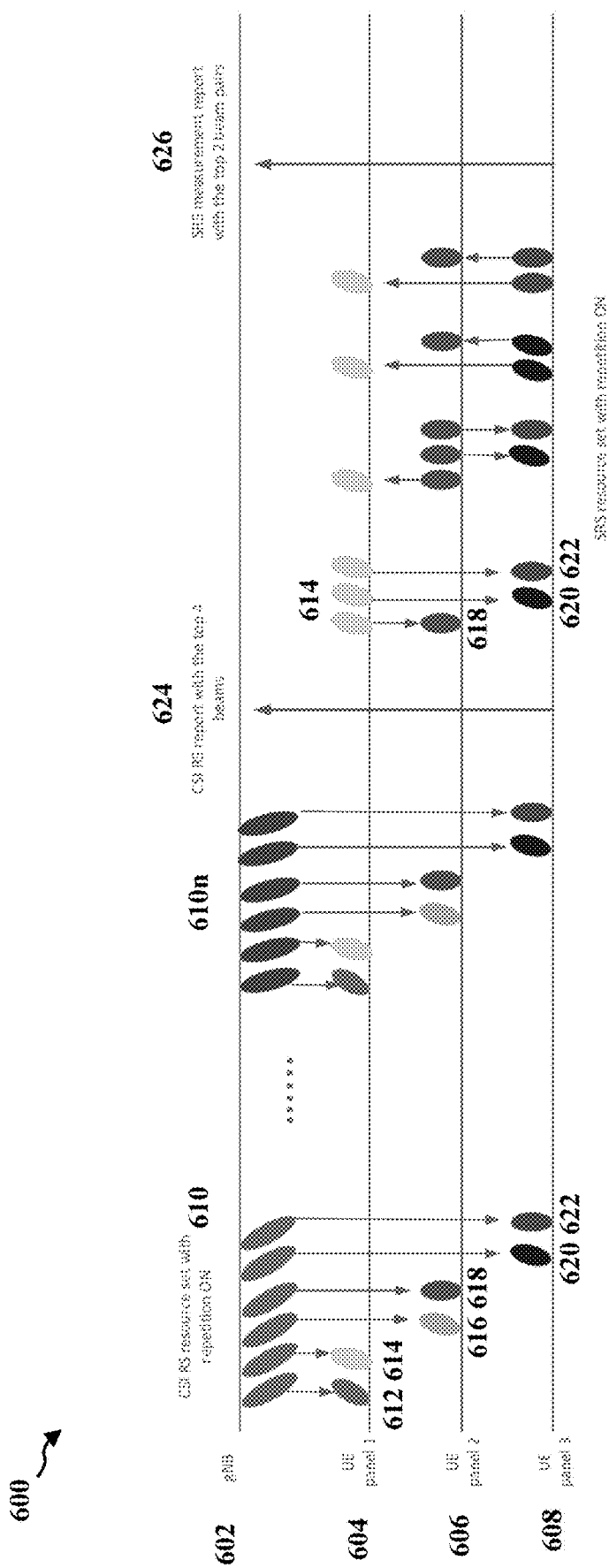
FIG. 6 is a diagram illustrating an example of a beam measurement process.

FIG. 6 is a diagram 600 illustrating a beam measurement process. The diagram 600 of FIG. 6 includes a base station 602, and a UE comprising multiple UE panels (e.g., UE panel1 604, UE panel2 606, UE panel3 608). The base station 602 may be configured with CSI-RS resource 610 set with repetition. The base station 602 may transmit the CSI-RS resource 610 to each receive (Rx) beam of the UE panels. For example, the CSI-RS resource 610 may be transmitted to Rx beams 612, 614 of UE panel1 604, to Rx beams 616, 618 of UE panel2 606, and to Rx beams 620, 622 of UE panel3 608. In the aspect of FIG. 6, each UE panel is shown as having two Rx beams, however, the disclosure is not intended to be limited to the aspects disclosed herein. In some aspects, the UE panels may have any number of Rx and/or transmit (Tx) beams.

The UE panels may measure the received CSI-RS 610 to determine which of the Rx beams are the best at the UE side, which may be based on the signal strength measured at the UE panels. The base station 602 may transmit multiple CSI-RS resources to the UE panels in order to measure the Rx beams at the UE side. For example, the base station 602 may have n CSI-RS transmissions 610n to the UE panels in order to determine which Rx beams are the strongest at the UE side.

The UE may then send a CSI-RS report 624 to the base station 602 indicating the top Tx beams at the base station with each Tx beam associated with a Rx beam at the UE side. The top Rx beams may be based on at least the received signal strength. In some aspects, the UE may report the top four Tx beams at the base station with each associated a Rx beam at the UE. However, in some aspects, the UE may report more or less than the top four Tx beams at the base station. Upon the determination of the top associated four Rx beams, the UE may perform a self-interference measurement (SIM) for the four beams.

To perform the SIM, the UE may transmit a transmission from the beam 614 from UE panel1 604, such that beams 618, 620, and 622 may measure the amount of energy they receive from the transmission of the beam 614. The transmission from the beam 614 may be an uplink transmission to the base station 602, however, during the uplink transmission from beam 614 to the base station 602, some energy may be received at the other panels. Such energy may be due to side lobes or based on the configuration of the other panels. As such, the beams 618, 620, and 622 may measure the amount of self-interference is caused by the transmission from the beam 614. This process repeats for all of the top four beams indicated in the CSI-RS report. For example, beam 618 may send a transmission such that beams 614, 620, and 622 measure the amount of self-interference caused by the transmission from beam 618. Upon the completion of the self-interference procedure, a SIM measurement report 626 may be sent to the base station 602 indicating the top one or more beam pairs based on the SIM results.

To perform the self-interference, a modified CLI configuration and procedure may be utilized. For example, the UE panels when sending the uplink transmission for the self-interference measurement may transmit an SRS. The transmitted SRS may be used to measure CLI from one or more neighbor UEs, but the transmitted SRS may also be utilized to measure SIM concurrently for inter-cell UEs and intra-cell UEs. This may allow for the self-interference procedure and CLI procedure to occur concurrently. Self-interference may be measured by SRS-RSRP, while total interference may be measured by RSSI. The UE may transmit the SRS at full power to perform the CLI measurement, while the UE may transmit the SRS at a reduced power to perform the SIM. The SRS transmission power may be configured by the base station within an SRS configuration. Indicating to the SRS transmitter that the SRS transmission is for a genuine CLI measurement allows for the SRS to be transmitted at full power. In some aspects, for the Tx configuration, the base station may provide an indication for a genuine CLI measurement (or other measurement processes) or for a full SRS Tx power or for a reduced SRS Tx power. In some aspects, for the Tx configuration, the base station may configure the full Tx power or the reduced Tx power based on X dBm or X % of the full Tx power.

For each measured SRS resource, a Rx QCL information may be added in the SRS resource configuration, which is for Tx. The Rx QCL may be configured in the measurement configuration for SRS-RSRP, for example, similar to the CSI resource setting which is the Rx configuration for the CSI-RS measurement. In the Rx configuration, the base station may also indicate a full or reduced Tx power based on X dBm or X % of full Tx power. In such instances, the Rx UE may scale up the calculated RSRP accordingly.

Each SRS resource may be configured to repeat. For example, each SRS resource may be configured to repeat at most N−1 times (e.g., with N candidate beams of 3 panels). Each SRS resource may be configured to repeat having the same or different "repetitionFactor" such that its cross Beam (xBeam) RSRP may be measured by the other N−1 UE beams on different panels. In some aspects, the inter-UE CLI may be measured by different Rx beams at another neighbor UE or by different neighbor UEs based on the CLI procedure. In some aspects, for each SRS resource with repetition, the UE implementation may select one applicable Rx beam to measure within a set of candidate Rx beams for SIM, while in some aspects, the measurement of the Rx beam may be guided by the base station based on the SIM configuration.

The selection of the DL and UL beam pair may consider SIM and CLI. The beam pair selected is one that has passed a threshold for selection. In some aspects, the UE may report that no beams pass the threshold, such that no feasible beam and/or beam pair is present. In some aspects, the base station may be configured to filter out high cross link interference candidate Tx beams for the UE, based on the one or more neighbor UE SRS-RSRP or CLI-RSSI measurement report. The base station may indicate the candidate Tx beams that do not have high interference to the UE. Based on the information sent by the base station, the UE may then be configured to filter out the candidate Tx beams with high CLI, and report the top one or more UL Tx and DL Rx beam pairs having the lowest xBeam RSRP and/or CLI SRS-RSRP to the base station. The top one or more UL Tx and DL Rx beam pairs may be reported to the base station based on the corresponding CSI-RS IDs. In some aspects, the base station may not send an indication to the UE of the candidate Rx beams having high interference. In such instances, the base station receives the CLI and/or SIM reports from the UE and one or more neighbor UEs, and may consider the CLI and/or SIM reports to select the top one or more UL and DL beam pairs. In some aspects, the UE may report beams with a panel ID in synchronization signal block (SSB)/CSI-RS measurements, such that the base station could avoid configuring intra-panel SIM in an effort to reduce resource overhead.

Figure 7:
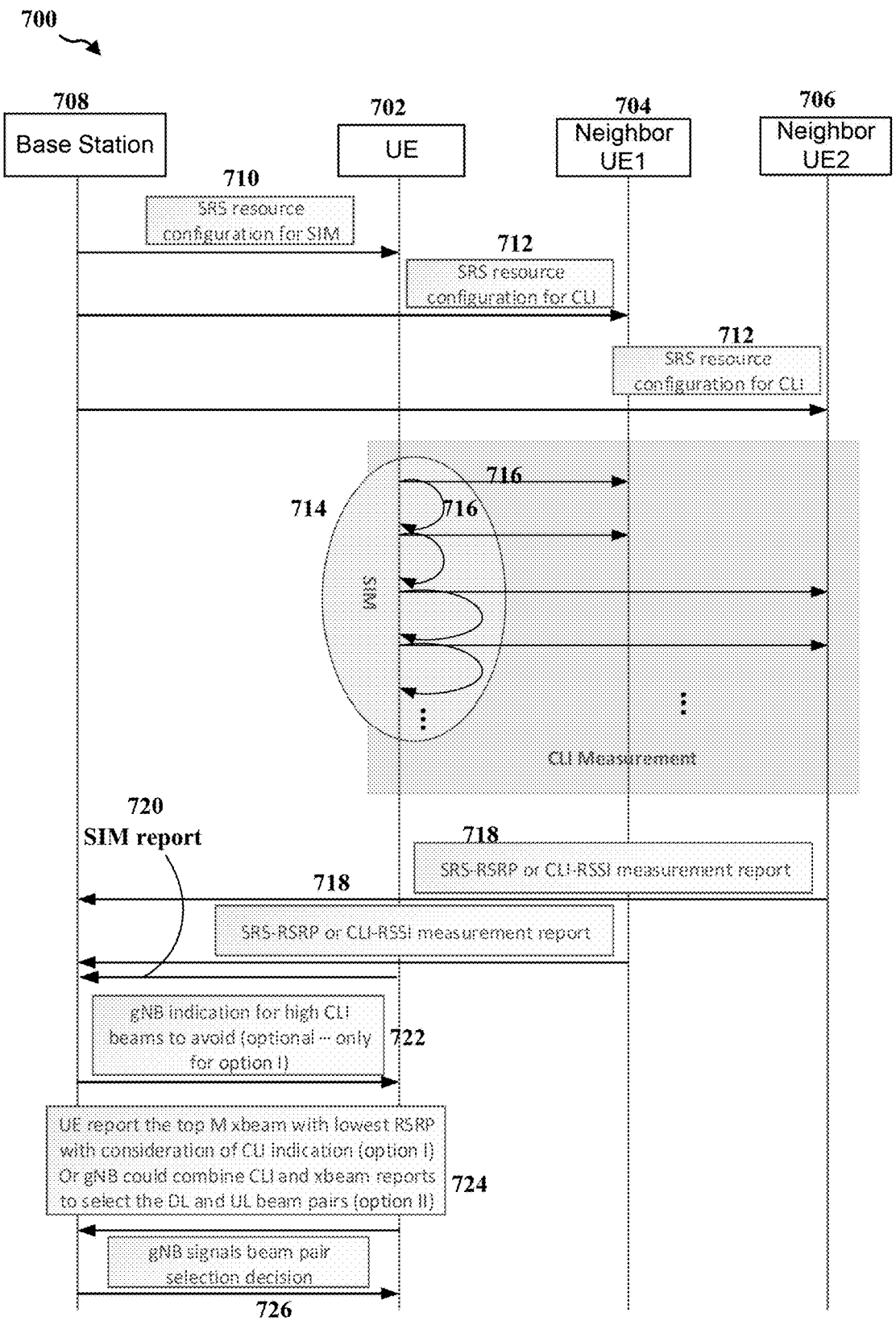
FIG. 7 is a call flow diagram of signaling between a UE, neighbor UEs, and a base station in accordance with certain aspects of the disclosure.

FIG. 7 is a call flow diagram 700 between a UE 702, neighbor UE1 704, neighbor UE2 706, and base station 708. Optional aspects are illustrated with a dashed line. The base station 708 may provide a cell serving UEs 702, 704, 706. For example, in the context of FIG. 1, the base station 708 may correspond to the base station 102/180 and, accordingly, the cell may include a geographic coverage area 110 in which communication coverage is provided and/or small cell 102' having a coverage area 110'. Further, the UEs 702, 704, 706 may correspond to at least UE 104. In another example, in the context of FIG. 3, the base station 708 may correspond to the base station 310 and the UEs 702, 704, 706 may correspond to the UE 350.

As illustrated in FIG. 7, the base station 708 may configure the UE 702 for a self-interference measurement (SIM) process 710, and configure a set of neighbor UEs (e.g., 704, 706) for a cross-link interference (CLI) process 712. In the aspect of FIG. 7, the set of neighbor UEs comprises two UEs, neighbor UE1 704 and neighbor UE2 706. However, in some aspects, the set of neighbor UEs may comprise more or less than two UEs, and the disclosure is not intended to be limited to the aspects disclosed herein. In some aspects, the base station 708 may configure the UE 702 to perform the SIM process 710 concurrently with the CLI process 712. The CLI process 712, from the base station 708, may configure each UE of the set of neighbor UEs (e.g., 704, 706) to receive SRS from the UE 702 as part of the CLI process 712, wherein the base station 708 receives a CLI measurement report from each UE of the set of neighbor UEs (e.g., 704, 706). The SRS from the UE 702 may be received by one or more beams of the one or more UEs of the set of neighbor UEs (e.g., 704, 706).

The UE 702 may be configured to determine a subset of Rx beams based on a beam measurement process, as shown in the diagram 600 of FIG. 6. Each Rx beam of the subset of Rx beams may be associated with one antenna array panel of a plurality of different antenna array panels. In some aspects, the beam measurement process may comprise the UE 702 receiving, from the base station 708, reference signals (RS) at each Rx beam of the plurality of different antenna array panels. Each Rx beam may be associated with a Tx beam from the base station 708. In some aspects, the subset of Rx beams determined from the beam measurement process may be the top candidate beams, selected based on the beam measurement process, used for a sweeping through the SRS (e.g., SIM process 710).

The UE 702, at 714, may sweep through transmitting SRS 716 from a Tx beam of an antenna array panel to each Rx beam of a plurality of different antenna array panels of the UE 702. The UE 702 may receive the transmitted SRS incrementally through other Rx beams associated with other panels of the plurality of different panels. In some aspects, the SRS may be transmitted to one or multiple beams of one neighbor UE or a set of neighbor UEs in a cross-link interference (CLI) measurement process. For example, the UE 702 may transmit the SRS to one or more beams of neighbor UE1 704 and/or neighbor UE2 706, where neighbor UE1 and UE2 are within the set of neighbor UEs. A plurality of Tx beams may be received by each Rx beam of one panel of the plurality of different panels.

The UE 702 may measure a self-interference based on the received SRS. For example, the UE 702 may measure for at least one pair of the Tx/Rx beams of the subset of beams to be used in FD communication. In some aspects, the UE 702 may perform FD by transmitting an uplink signal on a Tx beam from one antenna array panel while receiving a downlink signal on a Rx beam from a different antenna array panel. The pair of Tx/Rx beams having the reduced or least amount of self-interference, based on the received SRS, may be determined as a pair of Tx/Rx beams that the UE may use for FD.

After the measuring for the at least one pair of Tx/Rx beams, the UE 702 may select one or more pairs of Tx/Rx beams having the least self-interference based on a self-interference measurement. The UE 702 may report the selected one or more pairs of Tx/Rx beams to the base station 708. In some aspects, the UE 702 may select M pairs of Tx/Rx beams, where the number of M pairs of Tx/Rx beams reported to the base station 708 may be any number, and in some instances may include 0, such that the UE indicates in the report to the base station that no pairs of Tx/Rx beams are available for use by the UE 702 for FD. In some aspects, measuring the self-interference may comprise determining at least one of a reference signal received power (RSRP) of the received SRS or a reference signal strength indicator (RSSI) of the received SRS. In some aspects, the UE 702 may also report a panel identifier (ID) associated with each Rx beam of the subset of beams. Reporting the panel ID associated with each Rx beam to the base station, may assist the base station in configuring the UE 702 for self-interference measurements, such that a Tx beam and/or a Rx beam may not be scheduled to measure self-interference measurements if both the Tx beam and Rx beam are on the same panel.

In some aspects, the UE 702 may receive, from the base station 708, a configuration for a transmission power of the SRS, wherein the SRS is transmitted at a power in accordance with the received configuration. The UE 702 may receive the configuration for the transmission power of the SRS within the configuration for the SIM process 710. In some aspects, the configuration for the transmission power of the SRS may include an indicator for a full SRS Tx power or a reduced SRS Tx power. The reduced SRS Tx power may be reduced based on a ratio (e.g., dBm) or a percentage of the full SRS Tx power. In some aspects, the configuration for the transmission power of the SRS may include a CLI indicator to indicate whether the transmission of the SRS is for a real CLI measurement process or other measurement processes. In some aspects, the CLI indicator indicating a real CLI measurement process may configure the SRS transmission to be at full SRS Tx power. The CLI indicator indicating the other measurement processes may configure the SRS transmission to be at a reduced SRS Tx power. The reduced SRS Tx power may be utilized to conduct self-interference measurements, such that the UE may scale up the reduced SRS Tx power to calculate the RSRP accordingly.

In some aspects, the UE 702 may receive, from the base station 708, a quasi-co location (QCL) configuration. The QCL configuration may indicate that each Rx beam of the subset of Rx beams is associated with an SRS resource for transmission. The of the SRS resource may be repeated to each Rx beams in the sweeping (e.g., SIM process 710) based on the QCL configuration. In some aspects, the UE 702 may receive the QCL configuration within an SRS resource configuration or within an Rx measurement configuration for SRS-RSRP. For example, the UE 702 may receive the QCL configuration within the configuration for the SIM process 710. The Rx measurement configuration for SRS-RSRP may indicate a full or a reduced transmission power, wherein the reduced transmission power is reduced based on a ratio or a percentage of the full transmission power.

In some aspects, the UE 702 may receive, from the base station 708, a configuration indicating Tx beams from which to transmit SRS and Rx beams on which to receive the transmitted SRS, such that the sweeping through the transmission of the SRS and the reception of the SRS is based on the received configuration. In some aspects, the UE 702 may receive, form the base station 708, the configuration indicating the Tx beams to transmit SRS and Rx beams to receive the transmitted SRS within the configuration for the SIM process 710. Each SRS may be repeatedly transmitted, for example at 714, to sweep the Rx beams, and a plurality of SRS are repeatedly transmitted to sweep through the Tx beams. In some aspects, each SRS may be repeatedly transmitted at most N−1 times, where N is a number of Rx beams of the plurality of different antenna array panels. Each SRS may have a same or different repetition factor, such that a cross beam (xBeam) RSRP may be measured by at least one or more of the Rx beams on different antenna array panels. In some aspects, an inter-UE CLI may be measured by different Rx beams at another neighbor UE or by different neighbor UEs, based on a CLI measurement process. In some aspects, for each SRS, the UE may select one Rx beam to measure within a set of Rx beams for a SIM.

In some aspects, for example at 718, the base station 708 may receive a CLI measurement report. The base station 708 may receive a CLI measurement report from each UE of the set of neighbor UEs. For example, the base station 708 may receive a CLI measurement report from neighbor UE 1 704 and/or neighbor UE2 706. The CLI measurement report may comprise a CLI reference signal strength indicator (RSSI) measurement report. In some aspects, the neighbor UE1 704 and/or UE2 706 may transmit an sounding reference signals reference signal received power (SRS-RSRP) measurement report. In some aspects, the CLI measurement report may comprise an SRS-RSRP measurement report and/or a CLI-RSSI measurement report. In some aspects, the CLI measurement report from each UE of the set of neighbor UEs (e.g., 704, 706) may comprise at least one of a SRS-RSRP received from the UE 702 or an RSSI associated with reference signals including SRS received at the UE 702.

The UE 702, at 720, may transmit a SIM report indicating the SIM results. The UE 702 may transmit the SIM report indicating the SIM results to the base station 708. The base station 708 receives the SIM report from the UE 702. In some aspects, the base station 708 receives, from the UE 702, a SIM report of the top Tx beam/Rx beam pairs of the UE 702 having the least amount of self-interference. In some aspects, the SIM report received by the base station 708 from the UE 702 may indicate one or more Tx/Rx beam pairs of a plurality of Tx/Rx beams pairs of the UE 702, such that the one or more Tx/Rx beam pairs having a lowest cross beam (xBeam) RSRP and/or CLI SRS-RSRP. In some aspects, the SIM report may indicate that the no Tx/Rx beam pairs are reported within the SIM report.

The UE 702, at 722, may receive information indicating a first set of Tx beams having a CLI higher than a CLI threshold. The UE 702 may receive the information indicating that the first set of Tx beams have a CLI higher than the CLI threshold from the base station 708. The information indicating that the first set of Tx beams have a CLI higher than the CLI threshold may be based on CLI report 718 from each UE of the set of neighbor UEs, such as neighbor UE1 704 and/or UE2 706, received by the base station 708. For example, the base station 708 may filter out the high interference candidate Rx beams for the UE 702 and indicate such information to the UE 702.

The UE 702, at 724, may determine a second set of Tx beams that have a SIM less than a SIM threshold, wherein the UE may include in the SIM report, to the base station 708, one or more Tx/Rx beam pairs of a plurality of Tx/Rx beam pairs, where the reported one or more Tx/Rx beam pairs having the lowest cross beam (xBeam) RSRP and/or CLI SRS-RSRP. For example, in response to the base station 708 filtering out the high interference candidate Rx beams and transmitting such information to the UE 702, the UE may filter out the pairs of Tx/Rx beams with Rx beams having high CLI, and report to the bases station 708 the top one or more uplink and downlink beam pairs having the lowest xBeam RSRP and/or CLI SRS-RSRP. The one or more uplink and downlink beams pairs may be indicated to the base station 708 based on their corresponding CSI-RS IDs. In some aspects, the SIM report may include Tx and Rx beam identifiers (IDs), or corresponding CSI-RS IDs, or corresponding resource IDs, and a corresponding xBeam SRS-RSRP value. In some aspects, the UE 702 may determine one or more Tx beams of the first set of Tx beams having a SIM less than a SIM threshold, wherein the SIM report may indicate the one or more Tx beams, Tx and Rx beam IDs, or corresponding CSI-RS IDs, or corresponding resource IDs, and a corresponding xBeam SRS-RSRP value.

The base station 708, at 726, may select a Tx beam/Rx beam pair with the UE 702 based on the received SIM report and/or based on the CLI report from each UE of the set of neighbor UEs (e.g., 704, 706). The base station 708 may send an indication to the UE 702 of the selection of the Tx beam/Rx beam pair. The Tx beam/Rx beam pair selected by the base station 708 may be utilized to perform FD communications. In some aspects, the selection of the Tx beam/Rx beam may be based on the top one or more uplink and downlink beams pairs having the lowest xBeam RSRP and/or CLI SRS-RSRP indicated by the UE 702. In some aspects, the selection of the Tx beam/Rx beam may be based on the SIM report and/or the CLI measurement reports, such that the base station 708 may consider both reports to determine the selection of the Tx beam/Rx beam.

Figure 8:
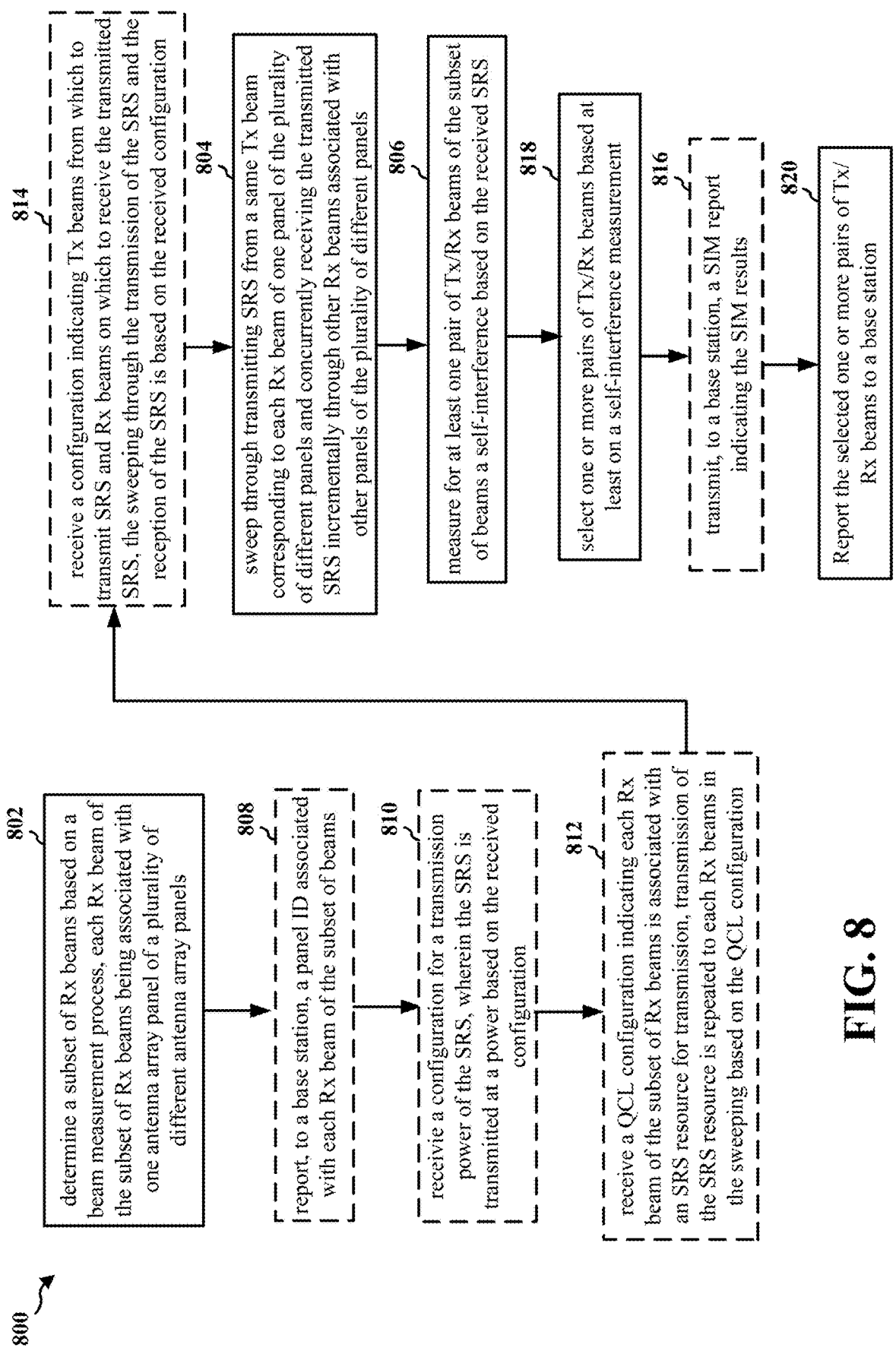
FIG. 8 is a flowchart of a method of wireless communication.

FIG. 8 is a flowchart 800 of a process of wireless communication. The process may be performed by a UE or a component of a UE (e.g., the UE 104, 402, 408, 502, 702, 704, 706; the device 350; a processing system, which may include the memory and components configured to perform each of the blocks of the process, and which may be the entire UE or a component of the UE, such as the TX processor 368, the RX processor 356, and/or the controller/processor 359). According to various aspects, one or more of the illustrated operation of the process 800 may be omitted, transposed, and/or contemporaneously performed. Optional aspects are illustrated with a dashed line. The process may enable a UE to determine Tx/Rx beam pairs suitable for full duplex communication based on a CLI procedure.

At 802, the UE may determine a subset of Rx beams based on a beam measurement process. Each Rx beam of the subset of Rx beams may be associated with one antenna array panel of a plurality of different antenna array panels. In some aspects, the beam measurement process may comprise receiving, from a base station, reference signals (RS) at each Rx beam of the plurality of different antenna array panels. Each Rx beam may be associated with a Tx beam from the base station. In some aspects, the subset of Rx beams may be top candidate beams, selected based on the beam measurement process, that may be used for the sweeping through the SRS.

In some aspects, for example at 808, the UE may report a panel identifier (ID) associated with each Rx beam of the subset of beams. The UE may report the panel ID associated with each Rx beam of the subset of beams to the base station.

In some aspects, for example at 810, the UE may receive a configuration for a transmission power of the SRS. The SRS may be transmitted at a power based on the received configuration. In some aspects, the configuration for the transmission power of the SRS may include an indicator for a full SRS Tx power or a reduced SRS Tx power. The reduced SRS Tx power may be reduced based on a ratio (e.g., dBm) or a percentage of the full SRS Tx power. In some aspects, the configuration for the transmission power of the SRS may include a cross-link interference (CLI) indicator. The CLI indicator may indicate whether transmission of the SRS is for a real CLI measurement process or other measurement processes.

In some aspects, for example at 812, the UE may receive a quasi-co location (QCL) configuration. The QCL configuration may indicate that each Rx beam of the subset of Rx beams may be associated with an SRS resource for transmission. In some aspects, the transmission of the SRS resource may be repeated to each Rx beams in the sweeping based on the QCL configuration. In some aspects, the QCL configuration is within an SRS resource configuration or within an Rx measurement configuration for SRS-RSRP. In some aspects, the Rx measurement configuration for SRS-RSRP may indicate a full or a reduced transmission power. The reduced transmission power may be reduced based on a ratio (e.g., dBm) or a percentage of the full transmission power.

In some aspects, for example at 814, the UE may receive a configuration indicating Tx beams from which to transmit SRS. The configuration may also indicate Rx beams on which to receive the transmitted SRS. The sweeping through the transmission of the SRS and the reception of the SRS may be based on the received configuration. In some aspects, each SRS may be repeatedly transmitted to sweep the Rx beams, and a plurality of SRS may be repeatedly transmitted to sweep through the Tx beams. In some aspects, each SRS may be repeatedly transmitted at most N–1 times, where N is a number of Rx beams of the plurality of different antenna array panels. Each SRS may have a same or different repetition factor, such that a cross beam (xBeam) RSRP may be measured by at least one or more of the Rx beams on different antenna array panels. In some aspects, an inter-UE CLI may be measured by different Rx beams at another neighbor UE or by different neighbor UEs, based on a cross-link interference (CLI) measurement process. In some aspects, the configuration indicating Tx beams to transmit SRS and Rx beams to receive the transmitted SRS may be within a self-interference measurement (SIM) configuration received from a base station. In some aspects, for each SRS, the implementation of the UE may be configured to select one Rx beam to measure within a set of Rx beams for a SIM.

At 804, the UE may sweep through transmitting sounding reference signals (SRS) from a same transmit (Tx) beam corresponding to each Rx beam of one panel of the plurality of different panels. The UE may receive the transmitted SRS incrementally through other Rx beams associated with other panels of the plurality of different panels. In some aspects, the SRS may be transmitted to one or multiple beams of one neighbor UE or a set of neighbor UEs in a cross-link interference (CLI) measurement process. In some aspects, a plurality of Tx beams may be received by each Rx beam of one panel of the plurality of different panels.

At 806, the UE may measure for at least one pair of Tx/Rx beams of the subset of beams a self-interference based on the received SRS. In some aspects, measuring the self-interference may comprise determining at least one of a reference signal received power (RSRP) of the received SRS or a reference signal strength indicator (RSSI) of the received SRS.

At 818, the UE may select one or more pairs of Tx/Rx beams having the least amount of self-interference based on the self-interference measurements.

In some aspects, for example at 816, the UE may transmit a SIM report indicating the SIM results. The UE may transmit the SIM report indicating the SIM results to a base station. In some aspects, the UE may receive, from the base station, information indicating a first set of Tx beams that have a CLI higher than a CLI threshold based on neighbor UEs CLI reports. The UE may determine a second set of Tx beams that have a SIM less than a SIM threshold. The SIM report may indicate one or more TX/Rx beam pairs of a plurality of Tx/Rx beam pairs. The one or more Tx/Rx beam pairs may have the lowest xBeam RSRP and CLI SRS-RSRP. In some aspects, the UE may indicate that the no Tx/Rx beam pairs are reported within the SIM report. In some aspects, the UE may be configured to filter out the first set of Tx beams having CLI higher than the CLI threshold. The SIM report may include at least one of Tx and Rx beam IDs, corresponding CSI-RS IDs, corresponding resource IDs, or a corresponding xBeam SRS-RSRP value. In some aspects, the UE may determine one or more Tx beams of a first set of Tx beams having a SIM less than a SIM threshold. The SIM report may indicate at least one of the one or more Tx beams, Tx and Rx beam IDs, corresponding CSI-RS IDs, corresponding resource IDs, or a corresponding xBeam SRS-RSRP value. In some aspects, the UE may receive, from the base station, an indication of a selection of the Tx beam/Rx beam pair.

At 820, the UE may report the one or more pairs of Tx/Rx beams to a base station. In some aspects, the UE may report 4 pairs of Tx/Rx beams to the base station, however, the UE may report a number of pairs of Tx/Rx beams that is less than or greater than 4.

The process in FIG. 8 may be performed by an apparatus that includes components configured to perform each of the blocks of the algorithm in the aforementioned flowchart of FIG. 8 and/or the aspects described in connection with the UE 702 in FIG. 7. As such, each block in the aforementioned flowchart of FIG. 8 and/or the aspects described in connection with FIG. 7 may be performed by a component and the apparatus may include one or more of those components. The components may be one or more hardware components specifically configured to carry out the stated processes/algorithm, implemented by at least one processor (e.g., controller/processor 359, RX processor 356, and/or TX processor 368 with reference to FIG. 3) configured to perform the stated processes/algorithm, stored within a computer-readable medium (e.g., memory 360) storing computer executable code that-when executed by a processor-instruct the processor to perform aspects of FIGS. 7 and/or 8, or some combination thereof.

Figure 9:
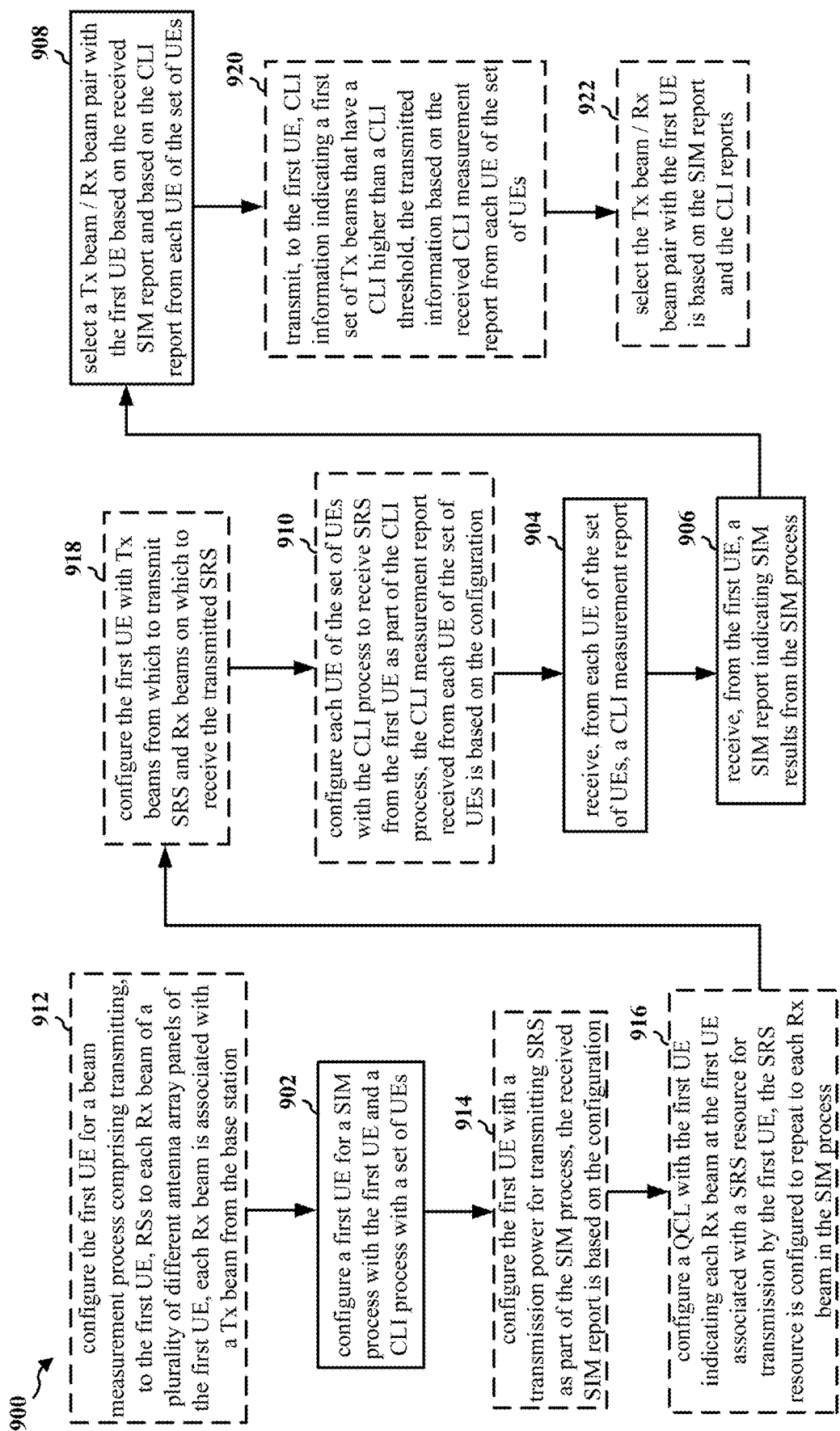
FIG. 9 is a flowchart of a method of wireless communication.

FIG. 9 is a flowchart 900 of a process of wireless communication. The process may be performed by a base station or a component of a base station (e.g., the base station 102, 180, 404, 410, 504, 604, 708; the device 310; a processing system, which may include the memory and component configured to perform each of the blocks of the process, and which may be the entire base station or a component of the base station, such as the TX processor 316, the RX processor 370, and/or the controller/processor 375). According to various aspects, one or more of the illustrated operations of the process 900 may be omitted, transposed, and/or contemporaneously performed. Optional aspects are illustrated with a dashed line. The process may enable a base station to configure a UE to determine Tx/Rx beam pairs suitable for full duplex communication based on a CLI procedure.

In some aspects, for example at 912, the base station may configure the first UE for a self-interference measurement process. The self-interference measurement process may comprise transmitting, to the first UE, reference signals (RSs) to each Rx beam of a plurality of different antenna array panels of the first UE. Each Rx beam may be associated with a Tx beam from the base station. In some aspects, a subset of Rx beams of the first UE may be determined based on a beam measurement process. The subset of Rx beams may be top candidate beams, selected based on the beam measurement process, for use in the SIM process. In some aspects, the base station may receive, from the first UE, a panel ID associated with each Rx beam of the subset of Rx beams.

At 902, the base station may configure a first UE for SIM process with the first UE. The configuration may also configure the first UE for a CLI process with a set neighbor of UEs.

In some aspects, for example at 914, the base station may configure the first UE with a transmission power for transmitting SRS as part of the SIM process. The received SIM report may be based on the received configuration. In some aspects, the configuration for the transmission power of the SRS may include an indicator for a full SRS Tx power or a reduced SRS Tx power. The reduced SRS Tx power may be reduced based on a ratio (e.g., dBm) or a percentage of the full SRS Tx power. In some aspects, the configuration for the transmission power of the SRS includes a CLI indicator to indicate whether transmission of the SRS is for a real CLI measurement process or other measurement processes.

In some aspects, for example at 916, the base station may configure a QCL with the first UE indicating each Rx beam at the first UE associated with a SRS resource for transmission by the first UE. The SRS resource may be configured to repeat to each Rx beam in the SIM process. In some aspects, the QCL configuration may be within an SRS resource configuration or within an Rx measurement configuration for SRS-RSRP. In some aspects, the Rx measurement configuration may indicate a full or a reduced transmission power, wherein the reduced transmission power is reduced based on a ratio (e.g., dBm) or a percentage of the full transmission power.

In some aspects, for example at 918, the base station may configure the first UE with Tx beams from which to transmit SRS and Rx beams on which to receive the transmitted SRS. In some aspects, each SRS may be configured to repeatedly transmit to the Rx beams, and a plurality of SRS are repeatedly transmitted to the Tx beams. Each SRS may be configured to repeatedly transmit at most N−1 times, where N is a number of Rx beams of a plurality of different antenna array panels of the first UE. In some aspects, each SRS may be configured to have a same or different repetition factor such that a xBeam RSRP is measured by at least one or more of the Rx beams on different antenna array panels. In some aspects, the configuration indicating Tx beams to transmit SRS and Rx beams to receive the transmitted SRS may be within the configuration for the SIM process.

In some aspects, for example at 910, the base station may configure each UE of the set of neighbor UEs with the CLI process to receive SRS from the first UE as part of the CLI process. The CLI measurement report received from each UE of the set of neighbor UEs may be based on the configuration. The SRS may be received by one or multiple beams of one or more UEs of the set of neighbor UEs.

At 904, the base station may receive a CLI measurement report. The base station may receive the CLI measurement report from each UE of the set of neighbor UEs. In some aspects, the CLI measurement report from each UE of the set of neighbor UEs may comprise at least one of a RSRP of SRS received from the first UE or a reference signal strength indicator (RSSI) associated with reference signals including SRS received at the UE.

At 906, the base station may receive a SIM report indicating SIM results from the SIM process. The base station may receive the SIM report indicating the SIM results from the first UE. In some aspects, the base station may receive, from the first UE, indication SIM report of the top Tx beam/Rx beam pairs of the first UE having the least self-interference. In some aspects, the received SIM report may indicate one or more Tx/Rx beam pairs of a plurality of Tx/Rx beams pairs of the first UE. The one or more Tx/Rx beam pairs may have the lowest xBeam RSRP and CLI SRS-RSRP.

At 908, the base station may select a Tx beam/Rx beam pair with the first UE based on at least one of the received SIM report or the CLI report from the set of neighbor UEs. In some aspects, the configuration of the first UE may comprise configuring the UE to perform the SIM process concurrently with the CLI process.

In some aspects, for example at 920, the base station may transmit CLI information indicating a first set of Tx beams that have a CLI higher than a CLI threshold. The base station may transmit the CLI information to the first UE. The transmitted information may be based on the received CLI measurement report from each UE of the set of neighbor UEs, wherein the received SIM report may based on the transmitted CLI information.

In some aspects, for example at 922, the base station may select the Tx beam/Rx beam pair with the first UE is based on at least one of the SIM report or the CLI reports. In some aspects, the base station may transmit, to the first UE, an indication of a selection of the Tx beam/Rx beam pair.

The process of FIG. 9 may be performed by an apparatus that includes components configured to perform each of the blocks of the algorithm in the aforementioned flowchart of FIG. 9 and/or aspects described in connection with the base station 708 in FIG. 7. As such, each block in the aforementioned flowchart of FIG. 9 and/or the aspects described in connection with FIG. 7 may be performed by a component and the apparatus may include one or more of those component. The components may be one or more hardware components specifically configured to carry out the stated processes/algorithm, implemented by at least one processor configured to perform the stated processes/algorithm (e.g., controller/processor 375, TX processor 316, and/or RX processor 370 with reference to FIG. 3), stored within a computer-readable medium (e.g., memory 376) storing computer executable code that—when executed by a processor—instruct the processor to perform aspects of FIGS. 7 and/or 9, or some combination thereof.

Figure 10:
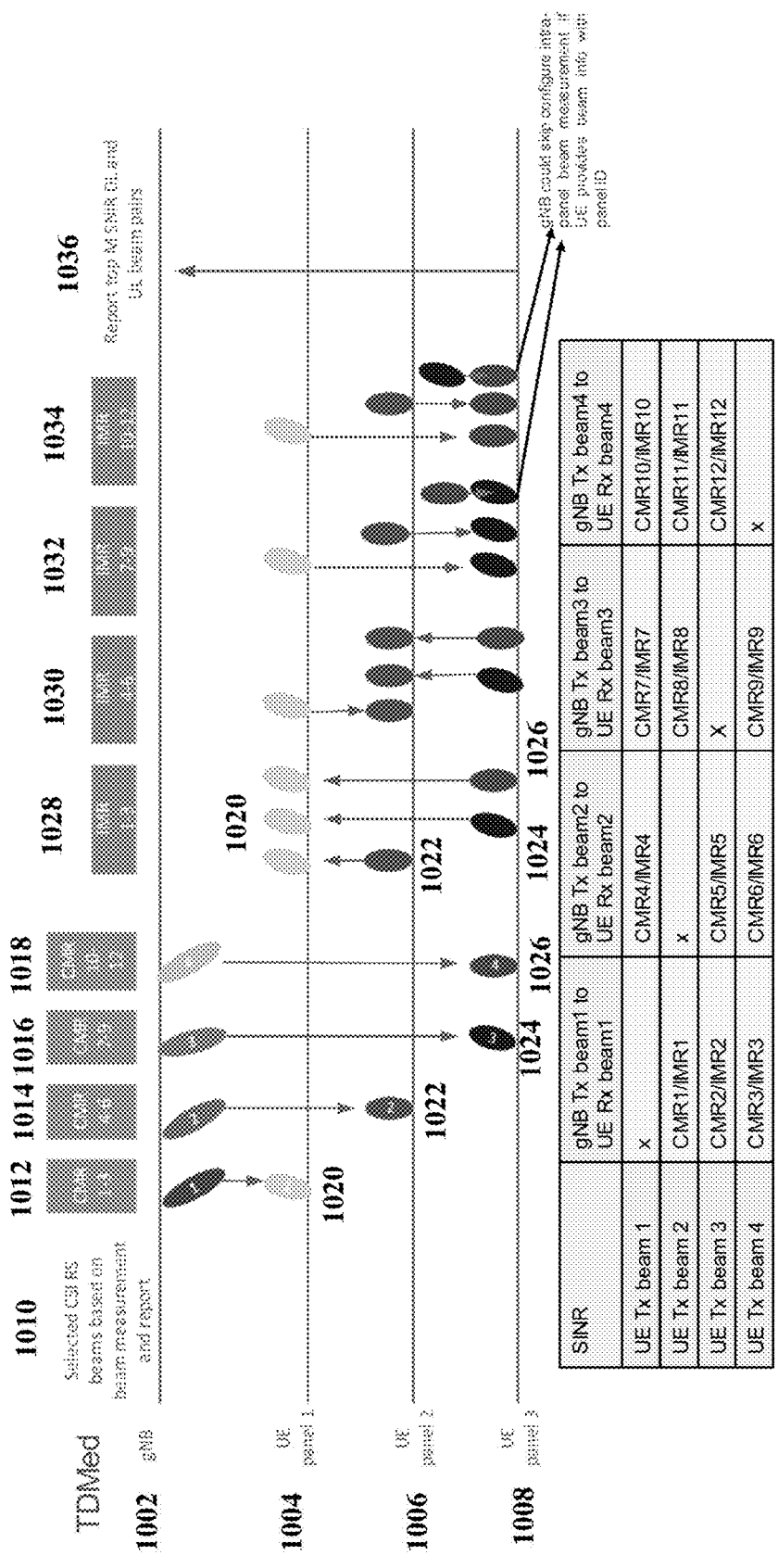
FIG. 10 is a diagram illustrating an example of a channel measurement process and an interference measurement process.

FIG. 10 is a diagram 1000 illustrating a beam measurement process. The diagram 1000 of FIG. 10 includes a base station 1002, and a UE comprising multiple UE panels (e.g., UE panel 1 1004, UE panel 2 1006, UE panel 3 1008). The base station 1002 and UE may be configured to select CSI-RS beams based on a beam measurement procedure (e.g., 1010). The beam measurement procedure 1010 may allow for the UE panels (e.g., 1004, 1006, 1008) to measure CSI-RS signals from the base station 1002 to determine which of the Rx beams of the best at the UE side, which may be based on the DL signal strength measured at the UE panels and each Rx beam is associated with a Tx CSI-RS beam at the base station. The beam measurement procedure 1010 may allow for the base station 1002 to transmit multiple CSI-RS resources to the UE panels in order to measure the DL channel quality or signal strength at the UE side. The UE may send a CSI-RS report to the base station 1002 indicating the top Tx beams at the base station with each associated with a top Rx beam at the UE side. The top Rx beams may be assumed to be the top Tx beams at the UE panels based on channel reciprocity. In some aspects, the UE may report the top four Tx beams. However, in some aspects, the UE may report more or less than the top four Tx beams. Upon the determination of the top four Tx beams with its associated top Rx beams at the UE, the UE may perform a self-interference measurement (SIM). UE may also report the top four beams each with an associated panel ID of the UE, so that gNB can avoid configuring intra-panel SIM to save resource overhead.

To perform the SIM, the UE may transmit a transmission from the beam 1020 from UE panel1 1004, such that beams 1022, 1024, and 1026 may measure the amount of energy they receive from the transmission of the beam 1020. The transmission from the beam 1020 may be an uplink transmission to the base station 1002, however, during the uplink transmission from beam 1020 to the base station 1002, some energy may be received at the beams of the other panels. Such energy may be due to side lobes or based on the configuration of the other panels. As such, the beams 1022, 1024, and 1026 may measure the amount of self-interference is caused by the transmission from the beam 1020. This process repeats for all of the top four beams indicated in the CSI-RS report. For example, beam 1022 may send a transmission such that beams 1020, 1024, and 1026 measure the amount of self-interference caused by the transmission from beam 1022. Upon the completion of the self-interference procedure and the channel measurement procedure, an indication 1036 may be sent to the base station 1002 indicating the top DL and UL beam pairs of the UE in a L1-SINR report via either the actual value or a largest value plus differential value of SINR. The DL and UL beams pairs selected as the top DL and UL beam pairs are beams that have passed a threshold for selection. In some aspects, the UE may report that no beams pass the threshold, such that no feasible beam and/or beam pair is present.

To perform the self-interference, a modified Layer 1 Signal-to-Interference-Plus-Noise Ratio (L1-SINR) configuration and procedure may be utilized. L1-SINR may include two resource settings, the first resource setting which may be provided by the higher layer parameter resourcesForChannelMeasurement is configured to perform channel measurement (CM) via CSI-RS. The CM may measure the channel quality. The second resource which may be provided by either higher layer parameter csi-IM-ResourcesForInterference or the higher layer parameter nzp-CSI-RS-ResourcesForInterference and is configured to perform interference measurement (IM) via CSI-RS. The modified L1-SINR may be configured to utilize SRS, instead of CSI-RS, to perform the IM procedure for SIM purpose. Each CSI-RS resource for channel measurement resource (CMR) may be associated with one SRS resource for interference measurement resource (IMR). The number of CSI-RS resources for CM may equal to the number of SRS resources for IM. The CMR may also be re-used for the original L1-SINR beam management purposes. In addition, the IMR may also be reused for CLI measurement purposes concurrently to measure the cross link interference at neighbor UEs using the same SRS resources used for SIM. In some aspects, the IMR configuration may be configured to define a full or reduced Tx power. For example, the reduced Tx power may be based on X dBm or X % of the full Tx power. The UE may use the configuration to scale up the calculated SINR accordingly.

With reference back to FIG. 10, the diagram 1000 provides an example of the CM and IM using the modified L1-SINR configuration and procedure. The CM portion includes four CMRs 1012, 1014, 1016, 1018 such that the base station 1002 is configured to transmit a CSI-RS to each of the top four Rx beams of the UE. For example, CMR 1012 may be transmitted to Rx beam 1020 of UE panel 1 1004, CMR 1014 may be transmitted to Rx beam 1022 of UE panel2 1006, CMR 1016 may be transmitted to Rx beam 1024 of UE panel3 1008, and CMR 1018 may be transmitted to Rx beam 1026 of UE panel3 1008. The UE may measure the channel quality received at the UE by the corresponding Rx beams. The UE may store the channel quality measurements under the CMR to determine the SINR.

The IM portion includes the same or more amount of resources as in the CM portion, such that the CMRs are mapped to a corresponding IMR. For example, each CMR is associated with an IMR for the interference measurement. Each CMR can also be mapped to multiple IMRs for measuring the interference to the same Rx beam as the CMR but transmitting from different beams of different panels of the UE. The IM portion includes four IMRs 1028, 1030, 1032, 1034 and are mapped to a corresponding CMR. For example, CMR 1012 may be mapped to IMR 1028, CMR 1014 may be mapped to IMR 1030, CMR 1016 may be mapped to IMR 1032, and CMR 1018 may be mapped to IMR 1034. The IM portion allows for SIM to be performed. To perform SIM, the IMRs configure the UE with SRS resources. Each of the beams (e.g., 1020, 1022, 1024, 1026) may be configured to transmit an SRS. For example, the UE panels when sending the uplink transmission for the SIM may transmit an SRS. The transmitted SRS may be utilized to measure SIM. In some aspects, the UE panel1 1004 may transmit the SRS at beam 1020, such that beams 1022, 1024, and 1026 may measure the amount of self-interference that is caused by the transmission from the beam 1020. This process repeats for all the other beams 1022, 1024, 1026. For example, beam 1022 may send a transmission such that beams 1020, 1024, and 1026 measure the amount of self-interference caused by the transmission from beam 1022. Upon the completion of the CM and the SIM, a SINR may be determined.

The mapping of the CMRs and the IMRs allows for a SINR to be calculated based on the results of the CM and IM portions. The SINR may be determined based on a ratio of the CMR and the corresponding IMR, as shown in the table of FIG. 10.

The aspect of FIG. 10 provides an example of CM and IM resources being TDM, such that the CM portion and the IM portion occur at different times. In some aspects, a DL timing may be utilized for the CM, while an UL timing may be utilized for the IM. In such instances, the SINR may be calculated based on a ratio of CM and IM and noise (e.g., CM/(IM+noise)). Upon the calculations of the SINR, the UE may report the SINR results to the base station 1002. The SINR results may include a report of the top SINR DL and UL beam pairs.

Figure 11:
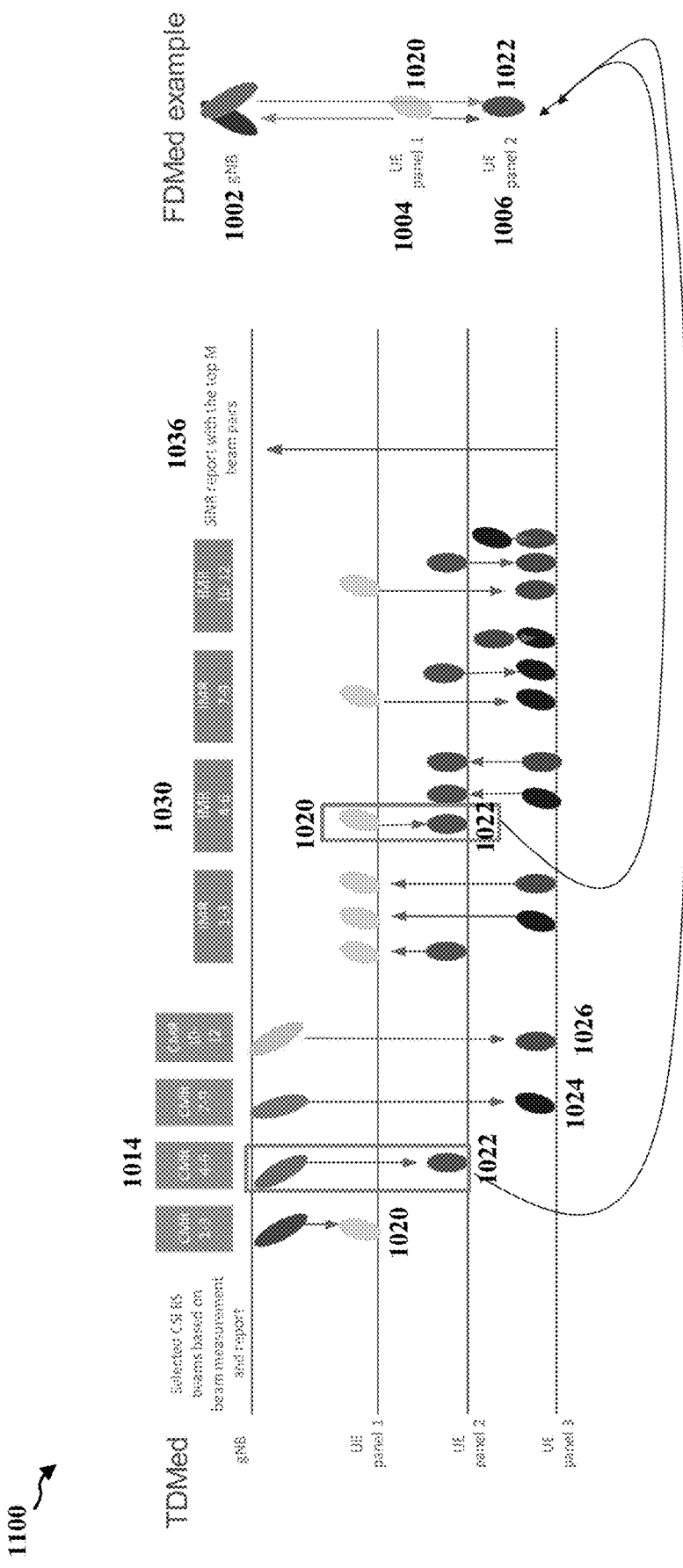
FIG. 11 is a diagram illustrating another example of a channel measurement process and an interference measurement process.

FIG. 11 is a diagram 1100 illustrating the CM and IM using the modified L1-SINR configuration and procedure. In the example of FIG. 11, the CM and IM resources are configured in a frequency division multiplexed (FDM) configuration, such that the CM and IM occur concurrently. For example, the CMR 1014 and IMR 1030 are shown in the FDM configuration. The base station 1002 may transmit the CSI-RS to be received by beam 1022 of UE panel2 1006, while the beam 1020 transmits the SRS that is received by beam 1022 of UE panel2 1006. The UE may measure the reception of the CSI-RS and the SRS in order to determine the SINR for the Rx beam 1022. In some aspects, the CM and IM procedures under the FDM configuration may experience time misalignment for DL and/or UL RSs. In some aspects, the UE may utilized DL timing or UL timing for both the CM and IM procedures concurrently happening in the FDM configuration. In aspects utilizing DL timing, the UE may calculate RSRP of the CSI-RS, and may calculate a partial RSSI for the interference and then an estimated SINR is calculated based on the CM and IM procedures.

In some aspects, a SINR may not be determined if the Rx and Tx beam are on the same panel. For example, with reference to FIG. 10, a SINR may not be determined for a Rx beam 1024 and a Tx beam of 1026, because they are one in the same panel. However, the base station may not be aware of the panel ID when configuring the SRS resources for the IMR. In such aspects, the base station may be configured to indicate whether the UE should still transmit the SRS in instances where the SRS beam and the SIM beam are on the same panel. In some aspects, the base station may be configured to indicate whether the UE should still transmit the SRS if the SRS is being reused for a CLI measurement at a neighbor UE.

In some aspects, the UE may be configured to indicate that one or more particular beam pairs may be an infeasible beam pair, such that the SRS beam and the SIM beam are on the same panel. In some aspects, the UE may be configured to indicate to the UE the existence of one or more infeasible beam pairs during the SIM configuration phase. In response to receiving the indication of infeasible beam pairs, the base station may update the SIM configuration and skip or prevent the configuring of intra-panel beam measurements, which may assist in wasting resources. In some aspects, if the UE indicates the existence of infeasible beam pairs, then the reported value of such beam pairs may be reported as background interference, instead of a self-interference value. In some aspects, such as for SIM, the UE may be configured to report beam with panel ID in synchronization signal block (SSB)/CSI-RS measurement, such that the base station may avoid or skip the configuring of intra-panel SIM which may assist in reducing and/or saving resource overhead.

Figure 12:
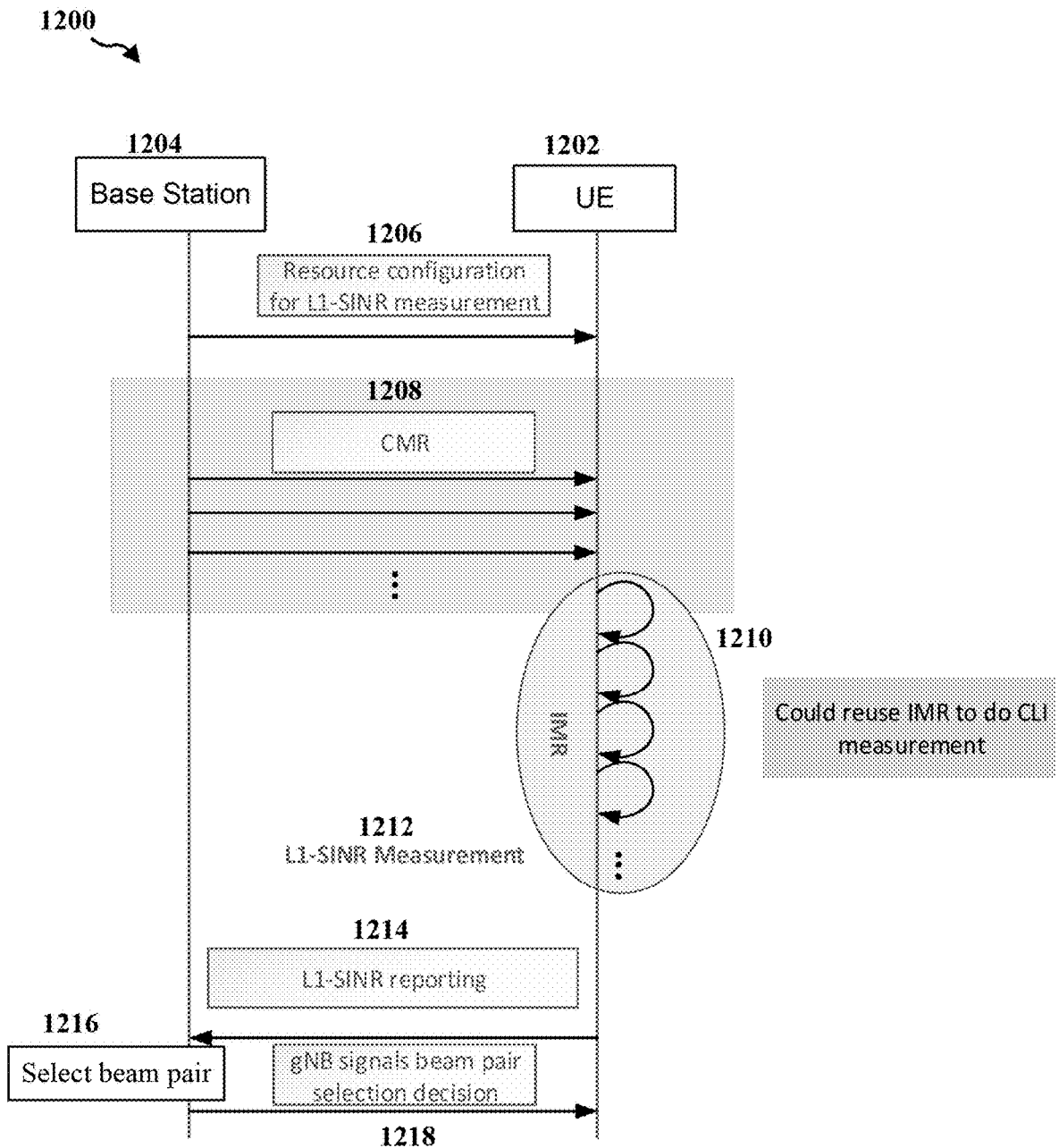
FIG. 12 is a call flow diagram of signaling between a UE and a base station in accordance with certain aspects of the disclosure.

FIG. 12 is a call flow diagram 1200 between a UE 1202 and a base station 1204. Optional aspects are illustrated with a dashed line. The base station 1204 may provide a cell serving UE 1202. For example, in the context of FIG. 1, the base station 1204 may correspond to the base station 102/180 and, accordingly, the cell may include a geographic coverage area 110 in which communication coverage is provided and/or small cell 102' having a coverage area 110'. Further, the UE 1202 may correspond to at least UE 104. In another example, in the context of FIG. 3, the base station 1204 may correspond to the base station 310 and the UE 1202 may correspond to the UE 350.

As illustrated in FIG. 12, the base station 1204 may provide, to the UE 1202, a resource configuration 1206 to perform an L1-SINR measurement. The L1-SINR configuration 1206 may include a resource configuration for a CM process and a resource configuration for a SIM process. The base station 1204 may configure the UE 1202 for the CM process 1208. The CM process 1208 may be based on a determined subset of Tx beams of a base station, wherein CM may be measured based on CSI-RS transmitted from the base station 1204. In some aspects, the CM process may be part of a L1-SINR measurement. The UE 1202 may perform the CM process 1208 based on a determined subset of Rx beams. In some aspects, the CM process may comprise performing a channel measurement between each of the subset of Rx beams with a corresponding antenna array panel of the plurality of different antenna array panels, and an associated Tx beam at the base station 1204.

The base station 1204 may also configure the UE for the SIM process 1210. The configuration for the SIM process 1210 may configure the UE to sweep through transmitting sounding reference signals (SRS) from a same Tx beam corresponding to each Rx beam of one antenna array panel of a plurality of different antenna array panels. The configuration for the SIM process 1210 may configure the UE to receive the transmitted SRS incrementally through other Rx beams associated with the plurality of different panels. The SIM process may modify an IM process of a L1-SINR measurement. In some aspects, a plurality of Tx beams may be received by each Rx beam of one panel of the plurality of different panels. In some aspects, a first resource configuring the CM process may be associated with a second resource configuring an IM process. The IM process may comprise the SIM process, wherein an interference measurement resource (IMR) of the SIM process may be concurrently used for CLI measurement. The base station 1204 may configure the UE 1202 with a transmission power for transmitting SRS as part of the SIM process 1210. In some aspects, a configuration for IMR may include an indicator for a full SRS Tx power or a reduced SRS Tx power. The reduced SRS Tx power may be reduced based on a ratio (e.g., dBm) or a percentage of the full SRS Tx power. A channel measurement resource (CMR) of the CM process may be mapped to one or more IMRs to measure multiple interference Tx beams to a same Rx beam. The Rx beam may be used to receive an associated CSI-RS transmission from a base station for the CM process. In some aspects, the CM process may be used for an L1-SINR beam management process. In some aspects, the first resource configuring the CM process and the second resource configuring the SIM process may be configured in a time division multiplexed (TDM) configuration. The first resource may comprise a plurality of resources for the CM process, wherein the second resource comprises a plurality of resources for the SIM process. In some aspects, downlink timing may be utilized to perform the CM process, and uplink timing may be utilized to perform the SIM process. In some aspects, the first resource configuring the CM process and the second resource configuring the SIM process may be configured in a frequency division multiplexed (FDM) configuration, wherein the CM process and the SIM process are performed concurrently. In some aspects, downlink timing may be utilized to perform the CM process and SIM process concurrently. In some aspects, uplink timing may be utilized to perform the CM process and SIM process concurrently.

In some aspects, the UE 1202 may determine a subset of Rx beams based on a beam measurement process. The base station 1204 may configure the UE 1202 to perform the beam measurement process. Each Rx beam of the subset of Rx beams may be associated with one antenna array panel of a plurality of different antenna array panels. The beam measurement process may comprise receiving, from a base station 1204, RS at each Rx beam of the plurality of different antenna array panels, wherein each Rx beam may be associated with a Tx beam from the base station 1204. The subset of Rx beams may be indicated as top candidate beams selected based on the beam management process to be used for sweeping through SRS of the SIM process 1210.

The UE 1202 may measure for at least one pair of Tx/Rx beams of the subset of beams a self-interference based on the received SRS in the SIM process 1210. In some aspects, the UE 1202 may report a panel identifier (ID) associated with each Rx beam of the subset of beams. The UE 1202 may report the panel ID associated with each Rx beam of the subset of beams to the base station.

The UE 1202 may determine a SINR 1212 based on results of the CM process 1208 and the SIM process 1210. A CMR of the CM process 1208 may be mapped to one or more IMRs of the SIM process 1210. The SINR 1212 may be determined by each pair of CMR and IMR measurement results. The UE 1202 may select one or more pairs of Tx/Rx beams having the highest SINR values. In some aspects, the UE 1202 may select M pairs of Tx/Rx beams based on the SINR, where M≥0. The UE 1202 may report the selected Tx/Rx beams to the base station 1204. The UE 1202 may select the one or more pairs of Tx/Rx beams based on the SINR values 1212.

The UE 1202, at 1214, may transmit to the base station 1204, an SINR report indicating the SINR results for each pair of CMR and IMR. The SINR report may include one or more SINR values for each of the subset of Rx beams with an associated Tx beam of the UE and corresponding Tx and Rx beam IDs or corresponding CSI-RS IDs or resource IDs. The UE 1202 may select the top one or more DL and UL beam pairs based on the SINR values to perform L1-SINR reporting based on an actual value or a largest value plus a differential value of SINR, wherein the top one or more DL and UL beams pairs pass a threshold. In some aspects, the UE 1202 may report that no DL and UL beam pairs are feasible to perform L1-SINR reporting if none of the DL and UL beam pairs pass the threshold. In some aspects, the threshold may be configured by the base station and signaled to the UE via RRC, MAC-CE, or DCI. In some aspects, the UE 1202 may receive, from the base station 1204, an indication 1218 of a selection of the DL and UL beam pairs.

The base station 1204, at 1216, may select a Tx UL beam/Rx DL beam pair with the UE 1202 based on the received SINR report 1214 from the UE 1202. In some aspects, selecting the Tx beam/Rx beam pair may include selecting a Tx beam or a Rx beam that may be greater than a SINR threshold. In some aspects, the base station 1204 may receive, from the UE 1202, an indication that a pair of Tx/Rx beams may not be compatible for the SIM if the pair of Tx/Rx beams are on the same antenna array panel. In some aspects, results of the SIM process may indicate that measurements associated with the pair of Tx/Rx beams identified as not compatible for the SIM process may be reported as a background interference value instead of a self-interference value. In some aspects, the base station 1204 may send, to the UE 1202, an indication as to whether to transmit the SRS if the SRS beam and the self-interference measurement beam are on the same panel. In some aspects, if the indication configures the UE 1202 to transmit the SRS using beams on the same panel, then the UE 1202 may be configured to use the SRS for CLI measurements but not for the SIM process 1210. In some aspects, the base station 1204 may receive, from the UE 1202, the indication that the pair of Tx/Rx beam may not be compatible in a SIM configuration phase, if the Tx/Rx beam are on the same panel.

In some aspects, the UE 1202 may report to the base station 1204, a pair of Tx/Rx beam that may not be compatible for the SIM process if the pair of Tx/Rx beams are on the same antenna array panel. In some aspects, the results of the SIM process may indicate that measurements associated with the pair of Tx/Rx beam identified as not compatible for the SIM process may be reported as a background interference value instead of a self-interference value. In some aspects, the UE may receive, from the base station, an indication as to whether to transmit the SRS if the SRS beam and the self-interference measurement beam are on the same panel. In instances where the indication indicates the UE to transmit the SRS using beams on the same panel, then the SRS may be used for CLI measurements but not for the SIM process. In some aspects, the UE may be configured to indicate that the pair of Tx/Rx beam may not be compatible in a SIM configuration phase, if the Tx/Rx beam are on the same panel.

Figure 13:
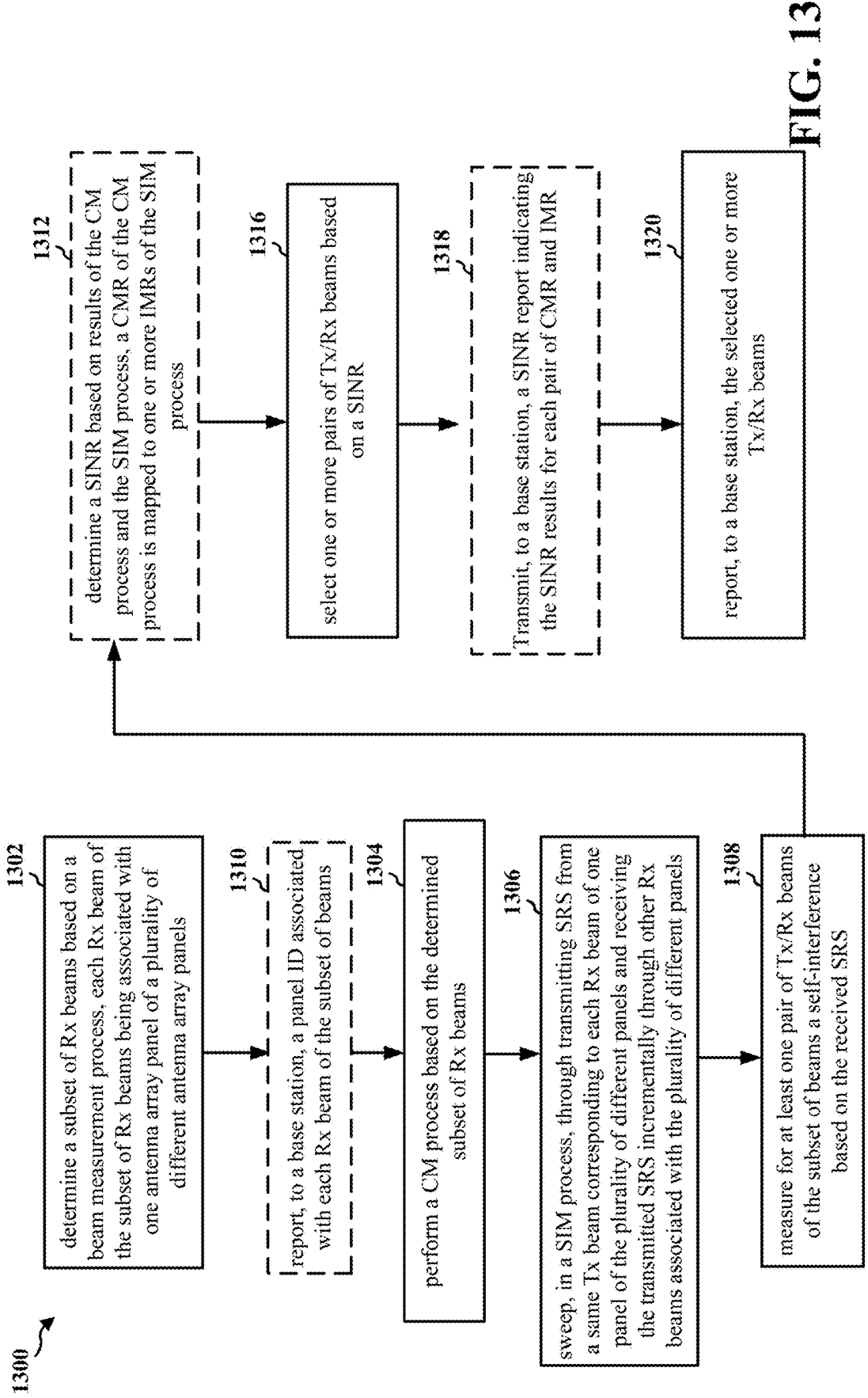
FIG. 13 is a flowchart of a method of wireless communication at a user equipment.

FIG. 13 is a flowchart 1300 of a process of wireless communication. The process may be performed by a UE or a component of a UE (e.g., the UE 104, 402, 408, 502, 1202; the device 350; a processing system, which may include the memory and components configured to perform each of the blocks of the process, and which may be the entire UE or a component of the UE, such as the TX processor 368, the RX processor 356, and/or the controller/processor 359). According to various aspects, one or more of the illustrated operation of the process 1300 may be omitted, transposed, and/or contemporaneously performed. Optional aspects are illustrated with a dashed line. The process may enable a UE to perform self-interference measurements using a modified L1-SINR configuration.

At 1302, the UE may determining a subset of receive (Rx) beams based on a beam measurement process. Each Rx beam of the subset of Rx beams may be associated with one antenna array panel of a plurality of different antenna array panels. In some aspects, the beam measurement process may comprise receiving, from a base station, reference signals (RS) at each Rx beam of the plurality of different antenna array panels. Each Rx beam may be associated with a Tx beam from the base station. In some aspects, the subset of Rx beams may be the top candidate beams used for the sweeping through SRS.

In some aspects, for example at 1310, the UE may report a panel identifier (ID) associated with each Rx beam of the subset of beams. The UE may report the panel ID associated with each Rx beam of the subset of beams to the base station.

At 1304, the UE may perform a channel measurement (CM) process based on the determined subset of Rx beams. In some aspects, the CM process may comprise performing a channel measurement between each of the subset of Rx beams and a corresponding antenna array panel of the plurality of different antenna array panels. The CM process may be based on a determined subset of Tx beams of a base station, wherein CM may be measured based on CSI-RS transmitted from the base station. In some aspects, the CM process may be part of a L1-SINR measurement.

At 1306, the UE may sweep, in a self-interference measurement (SIM) process, through transmitting SRS from a same transmit (Tx) beam corresponding to each Rx beam of one panel of the plurality of different panels. The UE may receive the transmitted SRS incrementally through other Rx beams associated with the plurality of different panels. In some aspects, a plurality of Tx beams may be received by each Rx beam of one panel of the plurality of different panels. In some aspects, a first resource configuring the CM process may be associated with a second resource configuring an IM process. The IM process may comprise the SIM process, wherein an interference measurement resource (IMR) of the SIM process may be concurrently used for CLI measurement. In some aspects, the SIM process may modify an IM process of an L1-SINR measurement. In some aspects, a configuration for IMR may include an indicator for a full SRS Tx power or a reduced SRS Tx power. The reduced SRS Tx power may be reduced based on a ratio (e.g., dBm) or a percentage of the full SRS Tx power. A channel measurement resource (CMR) of the CM process may be mapped to one or more IMRs to measure multiple interference Tx beams to a same Rx beam. The Rx beam may be used to receive an associated CSI-RS transmission from a base station for the CM process. In some aspects, the CM process may be used for an L1-SINR beam management process. In some aspects, the first resource configuring the CM process and the second resource configuring the SIM process may be configured in a time division multiplexed (TDM) configuration. The first resource may comprise a plurality of resources for the CM process, wherein the second resource comprises a plurality of resources for the SIM process. In some aspects, downlink timing may be utilized to perform the CM process, and uplink timing may be utilized to perform the SIM process. In some aspects, the first resource configuring the CM process and the second resource configuring the SIM process may be configured in a frequency division multiplexed (FDM) configuration, wherein the CM process and the SIM process are performed concurrently. In some aspects, downlink timing may be utilized to perform the CM process and SIM process concurrently. In some aspects, uplink timing may be utilized to perform the CM process and SIM process concurrently.

At 1308, the UE may measure for at least one pair of Tx/Rx beams of the subset of beams a self-interference based on the received SRS.

In some aspects, for example at 1312, the UE may determine a SINR based on results of the CM process and the SIM process. A channel measurement resource (CMR) of the CM process may be mapped to one or more interference measurement resource (IMRs) of the SIM process. The SINR may be determined by each pair of CMR and IMR measurement results.

At 1316, the UE may select one or more pairs of Tx/Rx beams. The UE may select Tx/Rx beams based on the SINR. For example, the UE may select the Tx/Rx beams based on SINR values calculated via the associated CM and IM processes.

In some aspects, for example at 1318, the UE may transmit, to a base station, a SINR report indicating the SINR results for each pair of CMR and IMR. The SINR report may include one or more SINR values for each of the subset of Rx beams with an associated Tx beam of the UE and corresponding Tx and Rx beam identifiers (IDs), corresponding CSI-Rs IDs, or resource IDs. The UE may select top one or more DL and UL beam pairs based on the SINR values to perform L1-SINR reporting based on an actual value or a largest value plus a differential value of SINR, wherein the top one or more DL and UL beams pairs pass a threshold. In some aspects, the UE may report that no DL and UL beam pairs are feasible to perform L1-SINR reporting if none of the DL and UL beam pairs pass the threshold. The threshold may be configured by the base station and signaled to the UE via RRC, MAC-CE, or DCI. In some aspects, the UE may receive, from the base station, an indication of a selection of the DL and UL beam pairs.

At 1320, the UE may report the selected one or more Tx/Rx beam pairs to a base station. In some aspects, the UE may report in an indication to the base station that no pairs of Tx/Rx beams have been selected based on the SINR.

In some aspects the UE may report, to a base station, a pair of Tx/Rx beam that is not compatible for the SIM process if the pair of Tx/Rx beams are on the same antenna array panel. The UE may identify the Tx/Rx beam based on the panel ID. In some aspects, the results of the SIM process may indicate that measurements associated with the pair of Tx/Rx beam identified as not compatible for the SIM process may be reported as a background interference value instead of a self-interference value. In some aspects, the UE may receive, from the base station, an indication as to whether to transmit the SRS if the SRS beam and the self-interference measurement beam are on the same panel. In instances where the indication indicates the UE to transmit the SRS using beams on the same panel, then the SRS may be used for CLI measurements but not for the SIM process. In some aspects, the UE may be configured to indicate that the pair of Tx/Rx beam may not be compatible in a SIM configuration phase, if the Tx/Rx beam are on the same panel.

The process in FIG. 13 may be performed by an apparatus that includes components configured to perform each of the blocks of the algorithm in the aforementioned flowchart of FIG. 13 and/or the aspects described in connection with the UE 1202 in FIG. 12. As such, each block in the aforementioned flowchart of FIG. 13 and/or the aspects described in connection with FIG. 12 may be performed by a component and the apparatus may include one or more of those components. The components may be one or more hardware components specifically configured to carry out the stated processes/algorithm, implemented by at least one processor (e.g., controller/processor 359, RX processor 356, and/or TX processor 368 with reference to FIG. 3) configured to perform the stated processes/algorithm, stored within a computer-readable medium (e.g., memory 360) storing computer executable code that-when executed by a processor-instruct the processor to perform aspects of FIGS. 12 and/or 13, or some combination thereof.

Figure 14:
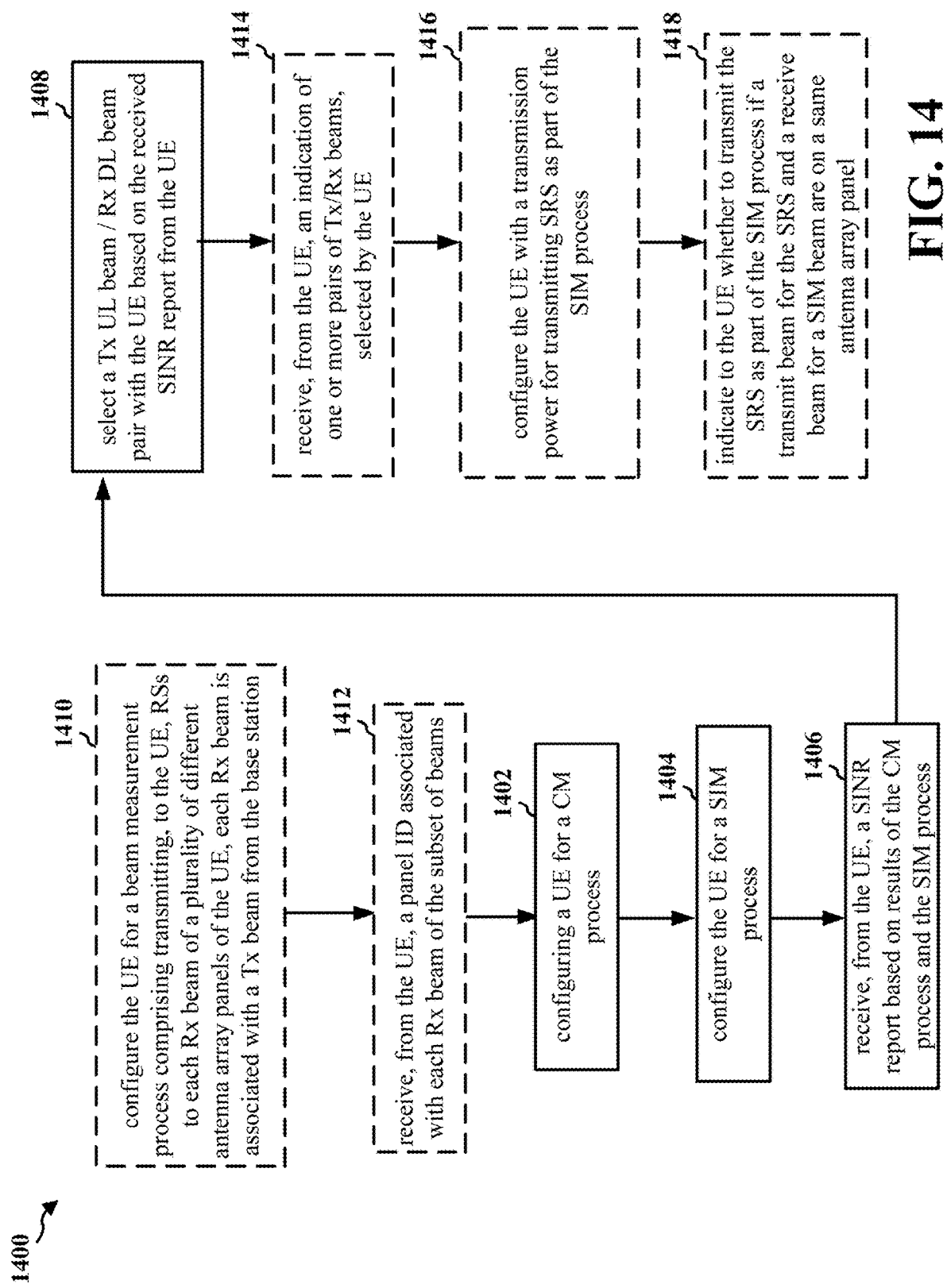
FIG. 14 is a flowchart of a method of wireless communication at a base station.

FIG. 14 is a flowchart 1400 of a process of wireless communication. The process may be performed by a base station or a component of a base station (e.g., the base station 102, 180, 404, 410, 504, 602, 1204; the device 310; a processing system, which may include the memory and component configured to perform each of the blocks of the process, and which may be the entire base station or a component of the base station, such as the TX processor 316, the RX processor 370, and/or the controller/processor 375). According to various aspects, one or more of the illustrated operations of the process 1400 may be omitted, transposed, and/or contemporaneously performed. Optional aspects are illustrated with a dashed line. The process may enable a base station to configure a UE to perform self-interference measurements using a modified L1-SINR configuration.

In some aspects, for example at 1410, the base station may configure the UE for a beam measurement process. The beam measurement process may comprise transmitting, to the UE, reference signals (RSs) to each Rx beam of a plurality of different antenna array panels of the UE. Each Rx beam may be associated with a Tx beam from the base station. In some aspects, a subset of Rx beams of the UE may be determined based on the beam measurement process, wherein the subset of Rx beams are top candidate beams used for the SIM process. In some aspects, the base station may receive, from the UE, a panel identifier (ID) associated with each Rx beam of the subset of Rx beams.

In some aspects, for example at 1412, the base station may receive a panel ID associated with each Rx beam of the subset of beams. The base station may receive the panel ID from the UE.

At 1402, the base station may configure a UE for a CM process. The CM process may be based on a determined subset of Tx beams of a base station, wherein CM may be measured based on CSI-RS transmitted from the base station. In some aspects, the CM process may be part of a L1-SINR measurement.

At 1404, the base station may configure the UE for a SIM process. The configuration for the SIM process may configure the UE to sweep through transmitting SRS from a same transmit beam corresponding to each receive beam of one antenna array panel of a plurality of different antenna array panels. The configuration for the SIM process may further configure the UE to receive the transmitted SRS incrementally through other receive beams associated with the plurality of different panels. In some aspects, the SIM process may modify an IM process of a L1-SINR measurement.

At 1406, the base station may receive, from the UE, a SINR report based on results of the CM process and the SIM process. The SINR report may comprise one or more SINR values for each of a subset of Rx beams with an associated Tx beam of the UE, and corresponding Tx and Rx beam identifiers (IDs) or corresponding CSI-RS IDs or resource IDs. The base station may receive, from the UE, an indication of a selection of the DL and UL beam pairs, wherein the UE selects the top one or more DL and UL beam pairs based on the SINR values to perform L1-SINR reporting based on an actual value or a largest value plus a differential value of SINR. The top one or more DL and UL beams pairs may pass a pre-configured threshold in order to be selected. In some aspects, the base station may receive, from the UE, an indication that no DL and UL beam pairs are feasible to perform L1-SINR if none of the DL and UL beam pairs pass the threshold. In some aspects, a first resource configuring the CM process may be associated with a second resource configuring an IM process. The IM process may comprise the SIM process, wherein an interference measurement resource (IMR) of the SIM process may be used concurrently for CLI measurement. In some aspects, a configuration for IMR may include an indicator for a full SRS Tx power or a reduced SRS Tx power. The reduced SRS Tx power may be reduced based on a ratio or a percentage of the full SRS Tx power. In some aspects, a channel measurement resource (CMR) of the CM process may be mapped to one or more IMRs to measure multiple interference Tx beams to a same Rx beam. The Rx beam may receive an associated CSI-RS transmission from the base station for the CM process. The CM process may be used for an L1-SINR beam management process. In some aspects, the first resource configuring the CM process and the second resource configuring the SIM process may be configured in a TDM configuration. The first resource may comprise a plurality of resources for the CM process, wherein the second resource may comprise a plurality of resources for the SIM process. In some aspects, downlink timing may be utilized to perform the CM process, and uplink timing may be utilized to perform the SIM process. In some aspects, the first resource configuring the CM process and the second resource configuring the SIM process may be configured in a frequency division multiplexed (FDM) configuration, wherein the CM process and the SIM process are performed concurrently. In some aspects, downlink timing may be utilized to perform the CM process and SIM process concurrently. In some aspects, uplink timing may be utilized to perform the CM process and SIM process concurrently.

At 1408, the base station may select a Tx UL beam/Rx DL beam pair with the UE based on the received SINR report from the UE. In some aspects, selecting the Tx beam/Rx beam pair may include selecting a Tx beam or a Rx beam that may be greater than a SINR threshold. In some aspects, the base station may receive, from the UE, an indication that a pair of Tx/Rx beams may not be compatible for the SIM if the pair of Tx/Rx beams are on the same antenna array panel. In some aspects, results of the SIM process may indicate that measurements associated with the pair of Tx/Rx beams identified as not compatible for the SIM process may be reported as a background interference value instead of a self-interference value. In some aspects, the base station may send, to the UE, an indication as to whether to transmit the SRS if the SRS beam and the self-interference measurement beam are on the same panel. In some aspects, if the indication configures the UE to transmit the SRS using beams on the same panel, then the UE may be configured to use the SRS for CLI measurements but not for the SIM process. In some aspects, the base station may receive, from the UE, the indication that the pair of Tx/Rx beam may not be compatible in a SIM configuration phase, if the Tx/Rx beam are on the same panel.

In some aspects, for example at 1414, the base station may receive an indication of one or more pairs of Tx/Rx beams that may have the highest SINR values. The base station may receive, from the UE, the indication of one or more pairs of Tx/Rx beams having the highest SINR values. In some aspects, the one or more pairs of Tx/Rx beams having the highest SINR values may be selected by the UE based on the results of the CM and IM process. In some aspects, the UE may indicate in the indication to the base station that no pairs of Tx/Rx beams have been selected based on the SINR.

In some aspects, for example at 1416, the base station may configure the UE with a transmission power for transmitting SRS. The base station may configure the UE with the transmission power for transmitting SRS as part of the SIM process.

In some aspects, for example at 1418, the base station may indicate to the UE whether to transmit the SRS as part of the SIM process if a transmit beam for the SRS and a receive beam for a SIM beam are on a same antenna array panel.

The process of FIG. 14 may be performed by an apparatus that includes components configured to perform each of the blocks of the algorithm in the aforementioned flowchart of FIG. 14 and/or aspects described in connection with the base station 1204 in FIG. 12. As such, each block in the aforementioned flowchart of FIG. 14 and/or the aspects described in connection with FIG. 12 may be performed by a component and the apparatus may include one or more of those component. The components may be one or more hardware components specifically configured to carry out the stated processes/algorithm, implemented by at least one processor configured to perform the stated processes/algorithm (e.g., controller/processor 375, TX processor 316, and/or RX processor 370 with reference to FIG. 3), stored within a computer-readable medium (e.g., memory 376) storing computer executable code that—when executed by a processor—instruct the processor to perform aspects of FIGS. 12 and/or 14, or some combination thereof.

Figure 15:
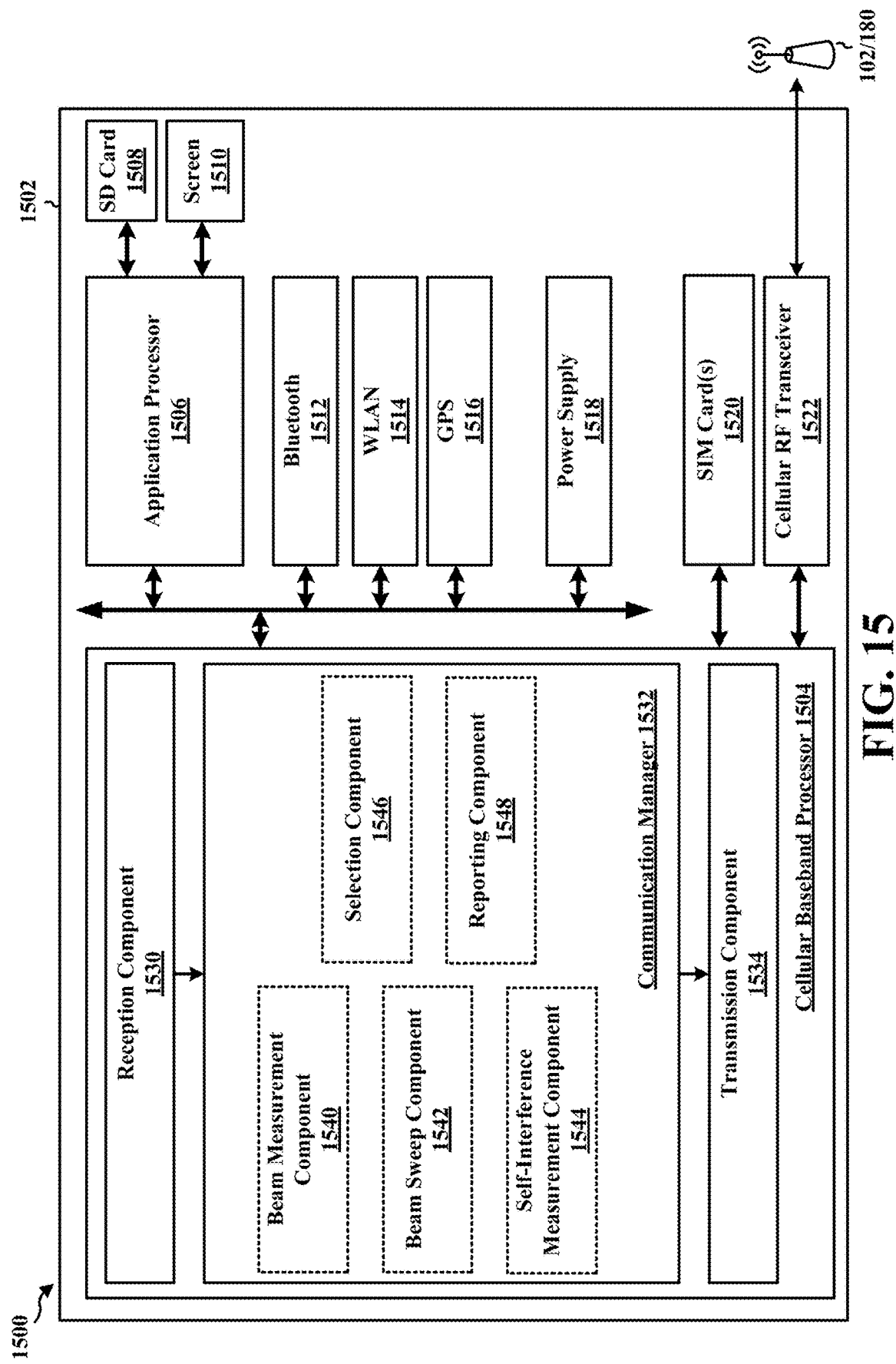
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE or other wireless device that communicates based on Uu direct link. The apparatus 1502 includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with other wireless devices, such as a UE 104 and/or base station 102/180. The cellular baseband processor 1504 may include a computer-readable medium/memory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 104 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire wireless device (e.g., see the UE 104 of FIG. 3) and include the additional modules of the apparatus 1502.

The communication manager 1532 includes a beam measurement component 1540, a beam sweep component 1542, a self-interference measurement component 1544, a selection component 1546 and/or a reporting component 1548 configured to perform the aspects described in connection with a process in FIGS. 8 and 13. The apparatus is illustrated as including components to perform the process of FIGS. 8 and 13, because the wireless device may operate as a transmitting device at times and may operate as a receiving device at other times.

The apparatus 1502 may include additional components that perform each of the blocks of the algorithm in the aforementioned flowcharts of FIGS. 8 and 13. As such, each block in the aforementioned flowcharts of FIGS. 8 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1502 may include means for determining a subset of receive (Rx) beams based on a beam measurement process, each Rx beam of the subset of Rx beams being associated with one antenna array panel of a plurality of different antenna array panels. For example, the beam measurement component 1540 may determine the subset of receive beams based on the beam measurement process. The apparatus 1502 also includes means for sweeping through transmitted sounding reference signals (SRS) from a same transmit (Tx) beam corresponding to each Rx beam of one panel of the plurality of different antenna array panels and receiving the transmitted SRS incrementally through other Rx beams associated with the plurality of different antenna array panels. For example, the beam sweep component 1542 may sweep through the SRS. The apparatus 1502 may further include means for measuring a self-interference for at least one pair of Tx/Rx beams of the subset of beams based on the received SRS. For example, the self-interference measurement component 1544 may measure the self-interference. The apparatus 1502 may further include means for selecting one or more pairs of Tx/Rx beams. For example, the selection component 1546 may select the Tx/Rx beams. The apparatus 1502 may further include means for reporting the selected one or more pairs of Tx/Rx beams to a base station (e.g., 102/180). For example, the reporting component 1548 may report the Tx/Rx beams.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
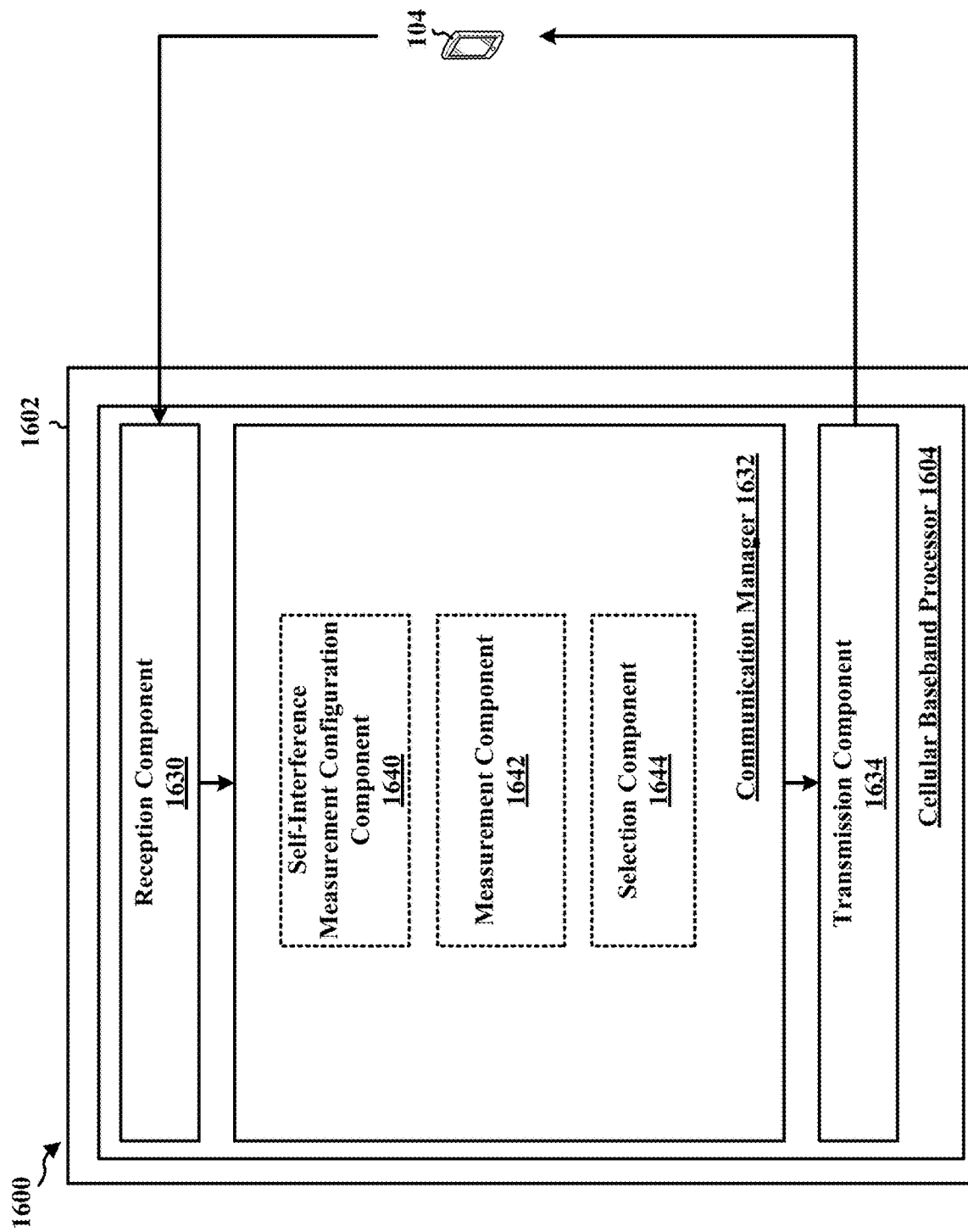
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station or other wireless device that communicates based on downlink/uplink. The apparatus 1602 includes a cellular baseband processor 1604 (also referred to as a modem) coupled to a RF transceiver 1624, a processor 1620 and a memory 1622. The cellular baseband processor 1604 communicates through the RF transceiver 1624 with other wireless devices, such as a UE 104. The cellular baseband processor 1604 may include a computer-readable medium/memory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The processor 1620 is responsible for general processing, including the execution of software stored on the computer-readable medium/memory 1622. The software, when executed by the processor 1620, causes the apparatus 1602 to perform the various functions described supra for any particular apparatus. The computer-readable medium/memory 1622 may also be used for storing data that is manipulated by the processor 1620 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the base station 102/180 and may include the memory 376 and/or at least one of the TX processor 316, the RX processor 370, and the controller/processor 375. In one configuration, the apparatus 1602 may be a modem chip and include just the baseband processor 1604, and in another configuration, the apparatus 1602 may be the entire wireless device (e.g., see the base station 102/180 of FIG. 3) and include the additional modules of the apparatus 1602.

The communication manager 1632 includes a self-interference measurement component 1640, a measurement component 1642 and/or a selection component 1644 configured to perform the aspects described in connection with the processes in FIGS. 9 and 14. The apparatus is illustrated as including components to perform the processes in FIGS. 9 and 14, because the wireless device may operate as a transmitting device at times and may operate as a receiving device at other times. In other examples, the apparatus 1602 may include components for the processes of FIGS. 9 and 14.

The apparatus 1602 may include additional components that perform each of the blocks of the algorithm in the aforementioned flowcharts of FIGS. 9 and 14. As such, each block in the aforementioned flowcharts of FIGS. 9 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1602 may further include means for configuring UE for self-interference measurement process. For example, the self-interference measurement configuration component 1640 may configure the UE for the self-interference measurement process. The apparatus 1602 also includes means for receiving, from the UE, a measurement report based on at least the SIM process. For example, the measurement component 1642, through coordination with the receive component 1630, may receive the measurement report based on the SIM process. The apparatus 1602 further includes means for selecting a beam pair with the UE based on the received measurement report. For example, the selection component 1644, through coordination with the measurement component 1642, may select the beam pair.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other embodiments or teachings described herein, without limitation.

Aspect 1 is a method of wireless communication of a user equipment that includes determining a subset of receive (Rx) beams based on a beam measurement process, each Rx beam of the subset of Rx beams being associated with one antenna array panel of a plurality of different antenna array panels; sweeping through transmitted sounding reference signals (SRS) from a same transmit (Tx) beam corresponding to each Rx beam of one panel of the plurality of different antenna array panels and receiving the transmitted SRS incrementally through other Rx beams associated with the plurality of different antenna array panels; measuring a self-interference for at least one pair of Tx/Rx beams of the subset of beams based on the received SRS; selecting one or more pairs of Tx/Rx beams; and reporting the selected one or more pairs of Tx/Rx beams to a base station.

In Aspect 2, the method of Aspect 1 further includes that the selecting comprises selecting the one or more pairs of Tx/Rx beams based at least on a self-interference measurement.

In Aspect 3, the method of Aspect 1 or Aspect 2 further includes that the selecting comprises selecting the one or more pairs of Tx/Rx beams based on a signal-to-interference-plus-noise ratio.

In Aspect 4, the method of any of Aspects 1-3 further includes that the sweeping comprises sweeping through the transmitted SRS in a self-interference measurement process.

In Aspect 5, the method of any of Aspects 1-4 further includes performing a channel measurement (CM) process based on the determined subset of Rx beams.

In Aspect 6, the method of any of Aspects 1-5 further includes that the performing the CM process comprises performing a channel measurement between each of the subset of Rx beams with a corresponding antenna array panel of the plurality of different antenna array panels and an associated Tx beam at the base station.

In Aspect 7, the method of any of Aspects 1-6 further includes determining a signal-to-interference-plus-noise ratio based on results of the CM process and the SIM process, wherein a channel measurement resource of the CM process is mapped to one or more interference measurement resource of the SIM process.

In Aspect 8, the method of any of Aspects 1-7 further includes that the beam measurement process comprises receiving, from a base station, reference signals (RS) at each Rx beam of the plurality of different antenna array panels, wherein each Rx beam is associated with a Tx beam from the base station.

Aspect 9 is a device including one or more processors and one or more memories in electronic communication with the one or more processors storing instructions executable by the one or more processors to cause a system or an apparatus to implement a method as in any of Aspects 1 to 8.

Aspect 10 is a system or apparatus including means for implementing a method or realizing an apparatus as in any of Aspects 1 to 8.

Aspect 11 is a non-transitory computer-readable medium storing instructions executable by one or more processors to cause the one or more processors to implement a method as in any of Aspects 1 to 8.

Aspect 12 is a method of wireless communication of a base station that includes configuring a user equipment for self-interference measurement process; receiving, from the UE, a measurement report based on at least the SIM process; and selecting a transmit uplink beam/receive downlink beam pair with the UE based on the received measurement report from the UE.

In Aspect 13, the method of Aspect 12 further includes that the configuring comprises configuring the UE for a cross-link interference (CLI) process with a set of neighbor UEs.

In Aspect 14, the method of Aspect 12 or Aspect 13 further includes that the receiving the measurement report comprises: receiving, from each UE of the set of neighbor UEs, a CLI measurement report; and receiving, from the UE, a SIM report indicating SIM results from the SIM process.

In Aspect 15, the method of any of Aspects 12-14 further includes that the selecting comprises selecting the Tx UL beam/Rx DL beam pair based on at least one of the received SIM report or the received CLI measurement report.

In Aspect 16, the method of any of Aspects 12-15 further includes configuring the UE for a channel measurement (CM) process.

In Aspect 17, the method of any of Aspects 12-16 further includes receiving, from the UE, a signal-to-interference-plus-noise ratio report based on results of the CM process and the SIM process.

In Aspect 18, the method of any of Aspects 12-17 further includes that the selecting comprises selecting the Tx UL beam/Rx DL beam pair based on the received SINR report.

Aspect 19 is a device including one or more processors and one or more memories in electronic communication with the one or more processors storing instructions executable by the one or more processors to cause a system or an apparatus to implement a method as in any of Aspects 12 to 18.

Aspect 20 is a system or apparatus including means for implementing a method or realizing an apparatus as in any of Aspects 12 to 18.

Aspect 21 is a non-transitory computer-readable medium storing instructions executable by one or more processors to cause the one or more processors to implement a method as in any of Aspects 12 to 18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, the method comprising:
    configuring a first user equipment (UE) to perform a self-interference measurement (SIM) process concurrently with a cross-link interference (CLI) process with a set of neighbor UEs;
    receiving, from the first UE, a first measurement report based on the SIM process;
    receiving, from a second UE of the set of neighbor UEs, a second measurement report based on the CLI process; and
    selecting a transmit (Tx) uplink (UL) beam/receive (Rx) downlink (DL) beam pair with the first UE based on at least one of the first measurement report or the second measurement report.

2. The method of claim 1, further comprising configuring the first UE for a channel measurement (CM) process.

3. The method of claim 2, further comprising receiving, from the first UE, a signal-to-interference-plus-noise ratio (SINR) report based on results of the CM process and the SIM process.

4. The method of claim 3, wherein the selecting comprises selecting the Tx UL beam/Rx DL beam pair based on the received SINR report.

5. An apparatus for wireless communication at a base station, comprising:
    one or more memories, individually or in combination, having instructions; and
    one or more processors, individually or in combination, configured to execute the instructions and cause the apparatus to:
        configure a first user equipment (UE) to perform a self-interference measurement (SIM) process concurrently with a cross-link interference (CLI) process with a set of neighbor UEs;
        receive, from the first UE, a first measurement report based on the SIM process;
        receive, from a second UE of the set of neighbor UEs, a second measurement report based on the CLI process; and
        select a transmit (Tx) uplink (UL) beam/receive (Rx) downlink (DL) beam pair with the first UE based on at least one of the first measurement report or the second measurement report.

6. The apparatus of claim 5, wherein the instructions, which when executed by the one or more processors, further causes the apparatus to configure the first UE for a channel measurement (CM) process.

7. The apparatus of claim 6, wherein the instructions, which when executed by the one or more processors, further causes the apparatus to receive, from the first UE, a signal-to-interference-plus-noise ratio (SINR) report based on results of the CM process and the SIM process.

8. The apparatus of claim 7, wherein the instructions, which when executed by the one or more processors, further causes the apparatus to select the Tx UL beam/Rx DL beam pair based on the received SINR report.

9. An apparatus for wireless communication at a base station, comprising:
    one or more memories, individually or in combination, having instructions; and one or more processors, individually or in combination, configured to execute the instructions and cause the apparatus to:
- transmit information configuring a user equipment (UE) to perform a self-interference measurement (SIM) process concurrently with a channel measurement (CM) process, wherein the transmitted information comprises a transmission power associated with UE-transmission of a sounding reference signal (SRS);
- receive, from the UE, a signal-to-interference-plus-noise ratio (SINR) report based on results of the SIM process and the CM process, wherein the SINR report is further based on a measurement of the SRS performed by the UE as part of the SIM process; and
- select a transmit (Tx) uplink (UL) beam/receive (Rx) downlink (DL) beam pair with the UE based on SINR report.

10. The apparatus of claim 9, wherein the configuration to perform the SIM process concurrently with the CM process comprises an interference measurement resource (IMR) associated with the SIM process.

11. The apparatus of claim 10, wherein the one or more processors, individually or in combination, are further configured to cause the apparatus to:
- transmit, to the UE, a channel state information reference signal (CSI-RS) via the IMR as part of the CM process.

* * * * *